US009479243B2

(12) United States Patent
Chang

(10) Patent No.: US 9,479,243 B2
(45) Date of Patent: Oct. 25, 2016

(54) RE-CONFIGURABLE ARRAY FROM DISTRIBUTED APERTURES ON PORTABLE DEVICES

(76) Inventor: Donald C. D. Chang, Thousand Oaks, CA (US)

(*) Notice: Subject to any disclaimer, the term of this patent is extended or adjusted under 35 U.S.C. 154(b) by 1229 days.

(21) Appl. No.: 13/236,418

(22) Filed: Sep. 19, 2011

(65) Prior Publication Data
US 2012/0069918 A1 Mar. 22, 2012

Related U.S. Application Data

(63) Continuation-in-part of application No. 13/231,681, filed on Sep. 13, 2011, now Pat. No. 8,862,050.

(60) Provisional application No. 61/384,811, filed on Sep. 21, 2010.

(51) Int. Cl.
H04B 7/08 (2006.01)
H01Q 1/24 (2006.01)
H01Q 3/24 (2006.01)
H01Q 3/26 (2006.01)
H01Q 21/20 (2006.01)

(52) U.S. Cl.
CPC .............. H04B 7/086 (2013.01); H01Q 1/242 (2013.01); H01Q 3/24 (2013.01); H01Q 3/2605 (2013.01); H01Q 21/20 (2013.01)

(58) Field of Classification Search
USPC ................. 342/81, 157, 354, 372, 373, 377
See application file for complete search history.

(56) References Cited

U.S. PATENT DOCUMENTS

| 6,061,023 | A | * | 5/2000 | Daniel et al. ................. 342/354 |
| 6,784,831 | B1 | * | 8/2004 | Wang et al. ............. 342/357.63 |
| 6,961,017 | B1 | * | 11/2005 | Naylor et al. ........... 342/357.29 |
| 2004/0113838 | A1 | * | 6/2004 | Wang et al. .................. 342/358 |
| 2008/0051080 | A1 | | 2/2008 | Walker |
| 2008/0291864 | A1 | | 11/2008 | Chang |

OTHER PUBLICATIONS

U.S. Appl. No. 12/462,145, filed Jul. 30, 2009, Chang.
U.S. Appl. No. 12/122,462, filed May 16, 2008, Chang.
U.S. Appl. No. 12/848,953, filed Aug. 2, 2010, Chang et al.
U.S. Appl. No. 12/847,997, filed Jul. 30, 2010, Lu, et al.
U.S. Appl. No. 61/497,852, filed Jun. 16, 2011, Chang.
U.S. Appl. No. 13/180,826, filed Jul. 12, 2011, Chang.
U.S. Appl. No. 12/951,995, filed Nov. 22, 2010, Chang et al.
U.S. Appl. No. 13/029,015, filed Feb. 16, 2011, Chang.

(Continued)

Primary Examiner — Dao Phan

(57) ABSTRACT

The present invention features novel methods of implementing configurable arrays for personal portable devices including hand-held mobile devices and re-locatable wireless devices, utilizing a wireless communications system that employs multiple individual hubs and/or base-stations. The digital beam forming (DBF) methodology utilizes multiple low gain elements conformal to the mechanical contours of handheld devices to function as arrays. The distributed N element arrays dynamically provide the options of reconfigurable shaped beams with near hemispheric radiation patterns for various handheld orientations and conditions by various users, while also supporting operations of multiple orthogonal beams concurrently connecting to multiple hubs. The larger the N becomes, the more flexibility the residing devices can provide.

28 Claims, 21 Drawing Sheets

(56) References Cited

OTHER PUBLICATIONS

Heinze, M.A., Anderson, C. S., Hendrix, C. E.; "Multigigabit transmission through rain in a dual polarization frequency reuse system: An experimental study;" IEEE Trans. Commun.; vol. 41; pp. 1830-1837; Dec. 1993.

Tallone, F., Ordano, L.; "Dual polarized propagation channel: THeoretical model and experiemental results;" Proc. 10th Int. Conf. Antennas and Propagation, vol. 2; Apr. 1997; pp. 363-366.

Chu. T. S.; "Restoring Orthogonality of two polarizations in radio communications systems I;" Bell Syst. Tech. J.; vol. 50; No. 9; pp. 3063-3069, Nov. 1971.

* cited by examiner

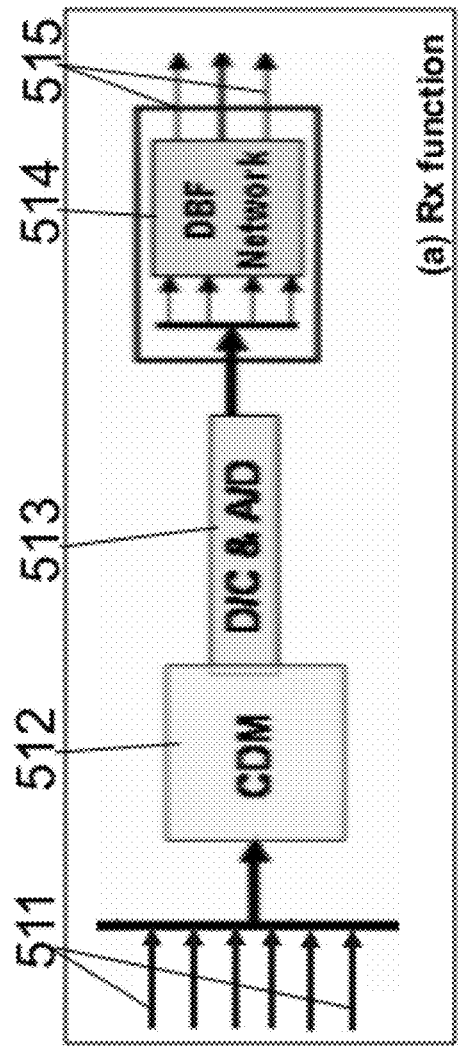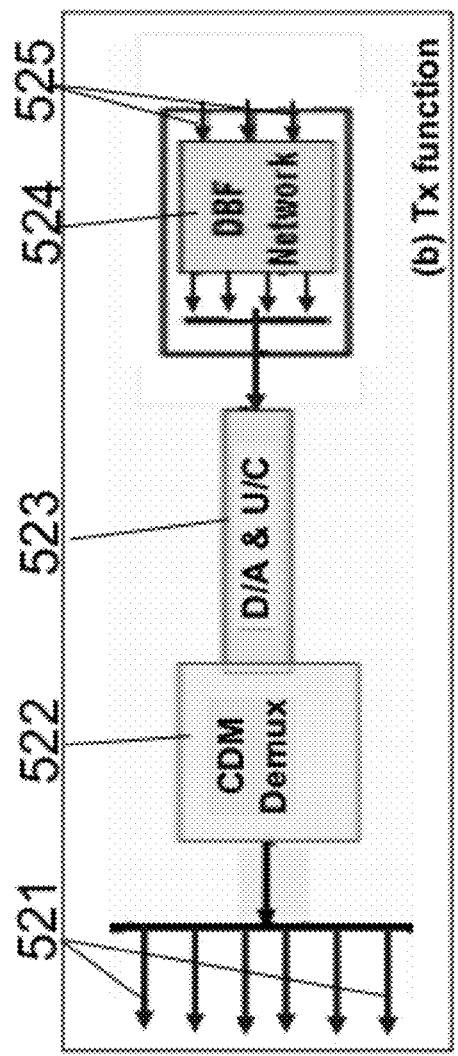
FIG. 5A
FIG. 5B

RE-CONFIGURABLE ARRAY FROM DISTRIBUTED APERTURES ON PORTABLE DEVICES

RELATED APPLICATION DATA

This application claims priority of provisional application No. 61/384,811, filed on Sep. 21, 2010.

BACKGROUND OF THE INVENTION

1. Field of the Invention

The present invention relates generally to RF subsystems for mobile and portable devices such as portable Global Navigation Satellite System (GNSS) receivers, 3G and 4G personal handheld devices and tablets, and portable WiFi and WiMax devices. GPS receivers are a part of GNSS receivers. More specifically, the present invention relates to unique approaches of distributed transmission/reception apertures that address two key concerns of RF antennas for portable and mobile devices: (1) fitting antennas into the limited space of a handheld device, while (2) maintaining the integrity of broad angular coverage. The same concepts can be extended for the hubs in microcells or those of Wifi and WiMax. Some potential advantages of the present invention include improved flexibility and utility efficiency of existing frequency assets.

2. Description of Related Art

Terrestrial wireless communication demands have experienced a massive increase in the last few decades due to the advent of WiFi, WiMax, 3G/4G networks, primarily due to the proliferation of portable hand-held devices that utilize such wireless communications technologies, such as 3G/4G cellular phones, tablet computers, portable music players, etc. This substantial increase in use of these devices has also resulted in a proliferation of IP-based products using ever-increasingly fast fiber optics and satellites for back-bone or transport applications. On the other hand, these high-speed access communications avenues to handheld devices are typically being emanated from ever-increasingly small wireless antennas. These small wireless antennas are required to radiate and receive in broad beams with near omni-directional capabilities, while maintaining suitable gain levels and power efficiencies despite receiving constant reductions in physical size. Therefore, effective spectrum utilization becomes more and more important due to the expeditious increase in demand for wireless "access" communications.

Currently, there are two key issues associated with these commercial wireless portable devices. Firstly, as the market for 3G and 4G portables continues to expand, demands for higher data rate channels continues to expand as well. With mobile frequency spectra becoming increasingly crowded, bandwidth becomes insufficient to satisfy current demand. Secondly, as a user holding a wireless hand-held device, its radiation/reception patterns or characteristics may change significantly due to interaction of the device and the user, either intentionally or unintentionally.

Presently, the majority of these wireless communications devices also have a navigational aids baked into the devices as well. It is therefore also desirable to explore antenna geometries that relate to Global Navigation Satellite Systems (GNSS). Specifically, it is desirable to explore antenna geometries that provide nearly full hemispherical coverage, in lieu of omni-directional antennas for data communications purposes. Key parameters of the 4 principle systems are listed in Table 1.

The United States NAVSTAR Global Positioning System (GPS) is currently the only fully operational GNSS. The Russian GLONASS is a GNSS in the process of being restored to full operation (it is practically restored, with 21 of 24 satellites operational by April 2010). On the other hand, the European Union's Galileo positioning system is a next generation GNSS in the initial deployment phase, with the In-Orbit-Validation (10V) phase taking place in 2010. Full Orbit Constellation (FOC) should be reached in 2015 (but this schedule is very flexible). China is also building up a global system called COMPASS, referred to as Beidou-2. Beidou-1 is a regional augmentation system.

TABLE 1

| Key orbital parameters of the 4 GNSS systems. | | | | |
|---|---|---|---|---|
| | GPS | GLONASS | GALILEO | COMPASS |
| Number of Satellites | 21 + 3 | 21 + 3 | 27 + 3 | 30 + 5 GEO |
| Number of orbital planes | 6 | 3 | 3 | ? |
| Semi-major axis | 26600 km | 25440 km | 29600 km | ? 21500 km |
| Orbital revolution period | 11:58 H | 11:15 H | 14:07 H | ? 12:35 H |
| Inclination | 55 deg | 64 deg | 56 deg | ? 55 deg |
| Satellite Mass | 1100 kg (IIR) | 1400 kg | 700 kg | ? 2200 kg |
| Solar panel area | 14 m2 | 23 m2 | 13 m2 | ??? |

This invention therefore intends to solve both issues in economical and efficient ways.

The distributed apertures may be configured to achieve broad beam width with a specified user holding the device. The distributed apertures may also be re-configured to form multiple orthogonal beams in order to enhance throughput for the portable devices. In particular, the applications of multiple small elements to "synthesize" radiation and receiving directional patterns dynamically for terrestrial wireless communications offer many potential advantages, including improved flexibility and utility efficiency of existing frequency assets.

Due to the technological advances concerning GPS/inertial navigation systems, low cost, mass-production handheld GPS systems have become commonplace, such as those that use commercial off-the-shelf Micro-Electro-Mechanical System (MEMS) accelerometers and gyroscopes. It has become very practical to estimate the "orientations" and motion trends of individual personal portable devices with respect to a fixed coordination system. The MEMS inertial measurement unit (IMU) is packaged in a small size and provides the raw IMU data through a serial interface to a processor board where the inertial navigation solution and integrated GPS/inertial Kalman filter is generated. Thus, spatial diversity for better spectrum utility can be implemented by low-cost and reliable processing techniques for consumer wireless communications markets such as receiving handheld devices for navigation, 3G and 4G mobile devices, as well as WiFi and WiMax devices.

SUMMARY OF THE INVENTION

The present invention utilizes multiple low gain elements conformal to the mechanical contours of handheld devices in order to function as arrays. The distributed N element arrays dynamically provide options for: 1) reconfigurable shaped beams with near hemispheric radiations patterns for various handheld orientations and conditions by various users, and 2) multiple orthogonal beams concurrent connecting to multiple hubs. The larger the N number becomes, the more flexibility the residing devices can provide. However, implementation cost also rises with the number of elements. Therefore, an efficient and practical solution is for an N number between 4 and 10.

Aperture Size and Orientations

Shaped beam antennas have been used extensively on commercial satellites. As early as the 1970s, simple beam shaping with 4 to 5 feed array feeds were used for minimum gain (~18 dB) over a global coverage (±9°) from a geostationary orbital slot. It became commonplace to use multiple feeds on the focal plane of a parabolic reflector to shape RF beams for good contour coverage of a service area. The 1980s brought about extensive use of shaped reflectors with single feeds covering desired service areas for commercial satellites. Both of these implementations are for fixed beam shaping capabilities on satellites.

However, since the 1990s, fixed and reconfigurable shaped contour beams deployed for mobile applications have been used via large parabolic reflectors with defocused feeds on satellites [2]. The element patterns, or secondary patterns, of those defocused feeds exhibited similar features of those of direct radiating arrays on curved surfaces. One of the features of both types of antennas is the extended coverage, which is the union of fields-of-view (FOV) of individual elements. We will use these features for the design of near-hemispheric coverage for handheld devices.

One of the goals of the present invention is to minimize aperture size, enabling array elements with large FOVs to see many GNSS satellites or many available hubs simultaneously. However, with distributed apertures using various element orientations, not every array element will view all GNSS satellites in the sky or all the available hubs simultaneously due to blockage of the element apertures themselves. This is an issue for non-planar arrays, as each element provides additional gain over various FOV through the beam forming process. Consequently, as the GNSS satellites and/or user platform move, some of the elements may be blocked with additional elements becoming available. In our inventions, there shall be enough elements with proper orientations to provide a near hemispherical coverage.

One of the design constraints is the ability to cover multiple discrete frequency bands. For WiFi the elements must cover both 2.4 and 5 GHz band. For communicating in the cellular spectrum, the elements must cover intended band width at UHF and L/S bands. For GPS, two frequency bands of interest are at (1) 1164 MHz to 1300 MHz (136 MHz) and (2) 1559 MHz to 1611 MHz (52 MHz).

However, the key challenge is how to position (including orientations) a set of small broadband elements to form a beam with a near hemispherical coverage while taking into account all mutual coupling effects among the small elements as well as those of the handsets.

Optimization on Element Positions

With a distributed array antenna, not all array elements can simultaneously view all GNSS satellites available or terrestrial hubs due to blockage of the element apertures. Translational reposition of an element generates biased phase-shifting among signals coming from different directions within its FOV. Quantitatively, phase shifting for those signals coming from a direction $\theta$ can be expressed as $$\Delta\phi(\text{in radiant}) = k * \Delta d * \cos\theta, \quad (1)$$

where k is the wave number, $\Delta d$ is the translational reposition distance, and $\theta$ is the arriving signal direction with respect to the translational moving direction of the element. For incoming directions in parallel to the translational moving direction, or $\theta=0°$, the element reposition will have profound effects on the phase of the received signals. Quantitatively, the equivalent phase shifting for those signals is $$\Delta\phi(\text{in radiant}) = k * \Delta d, \quad (1a)$$

where k is the wave number and $\Delta d$ is the translational reposition distance.

On the other hand, incoming signals from a direction perpendicular to the translational moving direction, or $\theta=90°$, the element reposition will have no effects on the phases of the received signals. Quantitatively, the equivalent phases shifting for those signals are $$\Delta\phi(\text{in radiant}) = 0, \quad (1b)$$

Multi-band low profile antennas using multilayer patch configurations have been successfully developed for consumer products. One such a product is manufactured over four bands at 1.268 GHz (RHCP, RCV), GPS (RHCP, RCV), 1.616 GHz (LHCP, XMIT) and 2.491 GHz (RHCP, RCV) for GNSS applications. For a N-element distributed array, radiation patterns are designed and generated through an iterative process based on desired performance constraints and the array geometry by varying the element weighting on their amplitudes and phases. The weighting, referered to as beam weight vectors (BWV), are implemented in a digital beam forming network (DBFN).

For production of large quantity of handheld devices, it is very cost effective to implement the 4-to-1 Rcv BFNs digitally with two options (a) L-band in and L-band out, or (2) L-band in and baseband out.

Because of the large bandwidth, we propose using the low dynamic range high speed approach for digitization with a sampling rate near 1 Gsps and a 1 bit resolution. Processed signals will regain their signal integrity in the digital domain by presuming, demuxing, band pass filtering, and then beam forming. While there are three branches of parallel processing as shown over three subbands, it is possible to do all processing in a single stream processing. The digital BFNs may be programmable. Rx antenna patterns of handheld devices may also be reconfigurable, or adaptable. The entire circuit can be implemented in a Si chip with a "loadable" mechanism via external programming to support optimized BWVs. However, this approach requires high initial investment to reach low-cost production.

A beam weight vector (BWV) for an array with distributed apertures featuring various N elements in different orientations will be optimized for a shaped beam with desired coverage. There are N-complexed components in a BWV, one complex component per element corresponding to amplitude and phase weighting of the signal.

Uniqueness of Invention

The invention features antennas with distributed low gain elements and a beam forming network (BFN) for handheld devices to provide reliable links between GNSS satellites and users for the navigations applications, or between available wireless hubs and users for the communications applications. A portable devices may have different array elements and configurable beam forming networks for navigations and communications individually. The near hemispheric shaped beam antenna arrays provide good RF field-of views for navigation/communications signals to and from the devices, but they have limited capabilities on isolations and directional discriminations.

Both the multiple beam design and the near omni coverage design approaches for a portable device include:

(1) locating the positions and orientation of the device (2) identifying available space in handheld devices for distributed N small elements in different orientations with various radiation patterns, (3) identifying desired radiation patterns and M key performance constraints according to current device orientations, and elements that are not "blocked" by holding hands, (4) performing radiation pattern simulations on the selected antenna array geometries with assumed element amplitude and phase weighting in a beam forming network with No inputs and 1 or multiple outputs, where No ≤N, (5) iteratively optimizing the weighting in the beam forming network to meet radiation patterns constraints, (6) reducing N and optimizing the element positions and orientation, and then go back to (4) until N is no more than No. Otherwise, relax the constraints in (3) and then go to (3) through (5).

Both the multi-beam including orthogonal beams (OB) and the near omni coverage optimization operation for a selected portable device include:

(1) locating the positions and orientation of the device (2) identifying available space in handheld devices for distributed N small elements in different orientations with various radiation patterns, (3) identifying desired radiation patterns and M key performance constraints according to current device orientations, and elements that are not "blocked" by holding hands, (4) performing radiation pattern simulations on the selected antenna array geometries with assumed element amplitude and phase weighting in a beam forming network with No inputs and 1 or multiple outputs, where No≤N, (5) iteratively optimizing the weighting in the beam forming network to meet key performance constraints, The radiation patterns of a handheld device are highly affected by RF interactions between the device and a user's hand which holds the device. It is desirable that the selected apertures are located at wherever less sensitive to the interactions with a user body. It is also possible that the selected apertures are re-configurable (or adaptive) depending on how and/or by whom the device is held. The design concepts are a fixed BFN with a set of fixed apertures. They can be extended to include "reconfigurable" apertures.

REFERENCES 1. www.positim.com/naysys_overview.html
2. US Patent Application No. 20080051080, "Ground-Based Beamforming For Satellite Communications Systems," By J. Walker filing date: Feb. 28, 2008
3. U.S. patent application Ser. No. 12/462,145; "Communication System for Dynamically Combining Power from a Plaurality of Propagation Channels in order to Improve Power Levels of Transmitted Signals without Affecting Receiver and Propagation Segments," by D. Chang, initial filing on Jul. 30, 2009.
4. U.S. patent application Ser. No. 12/122,462; "Apparatus and Method for Remote Beam Forming for Satellite Broadcasting Systems," by Donald C. D. Chang; initial filing May 16, 2008
5. U.S. patent application Ser. No. 12/848,953. "Novel Karaoke and Multi-Channel Data Recording/Transmission Techniques via Wavefront Multiplexing and Demultiplexing," by Donald C. D. Chang, and Steve Chen Initial Filing on Aug. 2, 2010
6. U.S. patent application Ser. No. 12/847,997; "Polarization Re-alignment for Mobile Satellite Terminals," by Frank Lu, Yulan Sun, and Donald C. D. Chang; Filing on Jul. 30, 2010.
7. C. E. Hendrix, G. Kulon, C. S. Anderson, and M. A. Heinze, "Multigigabit transmission through rain in a dual polarization frequency reuse system: An experimental study," *IEEE Trans. Commun.*, vol. 41, pp. 1830-1837, Dec. 1993.
8. L. Ordano and F. Tallone, "Dual polarized propagation channel: Theoretical model and experimental results," in *Proc.* 10*th Int. Conf. Antennas and Propagation*, vol. 2, Apr. 1997, pp. 363-366.
9. T. S. Chu, "Restoring the orthogonality of two polarizations in radio communication systems I," *Bell Syst. Tech. J.*, vol. 50, no. 9, pp. 3063-3069, Nov. 1971.
10. U.S. patent applications Ser. No. 61/497,852; "Allications of parallel Processing via Wavefront Multiplexing," by D. Chang filed as PPA on Jun. 16, 2011.
11. U.S. patent application Ser. No. 13/180,826; "Flexible Multichannel Amplifiers via Wavefront Muxing Techniques," by D. Chang filing on Jul. 12, 2011.
12. US patent application publication No. 20080291864; "Apparatus And Method For Remote Beam Forming For Satellite Broadcasting Systems," by D. Chang; filed on May 16, 2008
13. U.S. patent application Ser. No. 12/951,995, "A receiver with orthogonal beam forming technique," by D C D. Chanq, Y. L. Sun and F. Lu filing date: Nov. 22, 2010
14. U.S. patent application Ser. No. 13/029,015, "Satellite ground terminal incorporating a smart antenna that rejects interference," by D. Chang filing date: Feb. 16, 2011

BRIEF DESCRIPTION OF THE DRAWINGS

FIG. 5a illustrates a multi-element configurable Rx function featuring A/D modules and digital beam forming (DBF) network for portable handheld and laptop devices.

FIG. 5b illustrates a multi-element configurable Tx function featuring D/A and up-converter modules and digital beam forming (DBF) network for portable handheld and laptop devices.

FIG. 6 depicts simulated results of a configurable distributed array.

DETAILED DESCRIPTION OF THE PREFERRED EMBODIMENT

Figure 1:
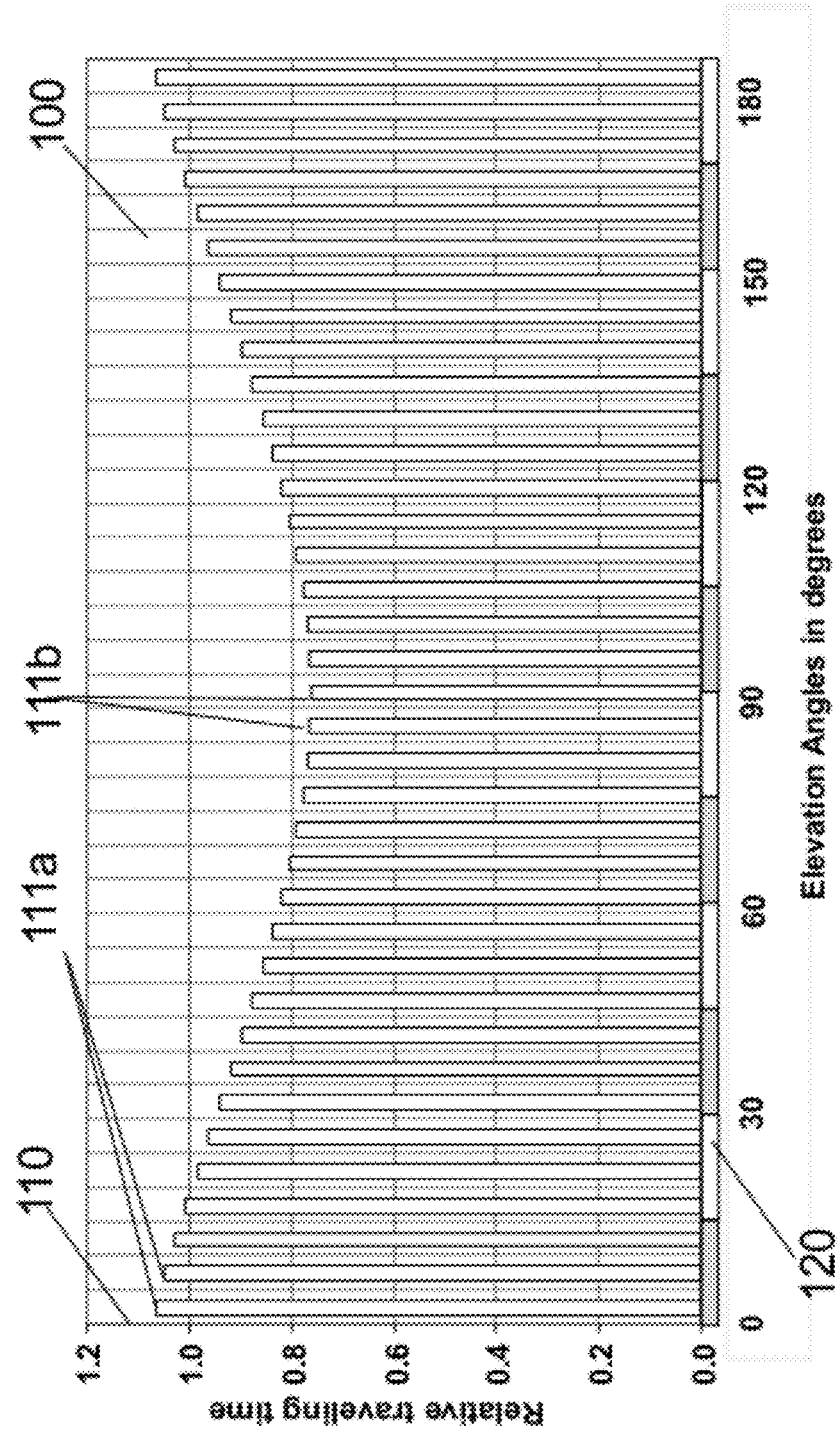
FIG. 1 depicts relative ground observable time of a GPS satellite orbiting through local zenith.

FIG. 1 100 illustrates relative time duration 110 of a GPS satellite orbiting through local zenith as a function of local elevation angle 120. A user has about 40% more time to observe the GPS satellite traveling over low elevations near horizon 111a than that near the local zenith 111b. Naystar GPS satellites are deployed in 6 nearly circular orbital planes, with 4 satellites equally spaced within a plane. The orbital planes are at an inclination of 55 degrees. The GPS satellite series coverage means anywhere from 4 to 12 satellites are above an observers horizon, with satellites being visible for many hours above an observer's horizon.

Figure 2:
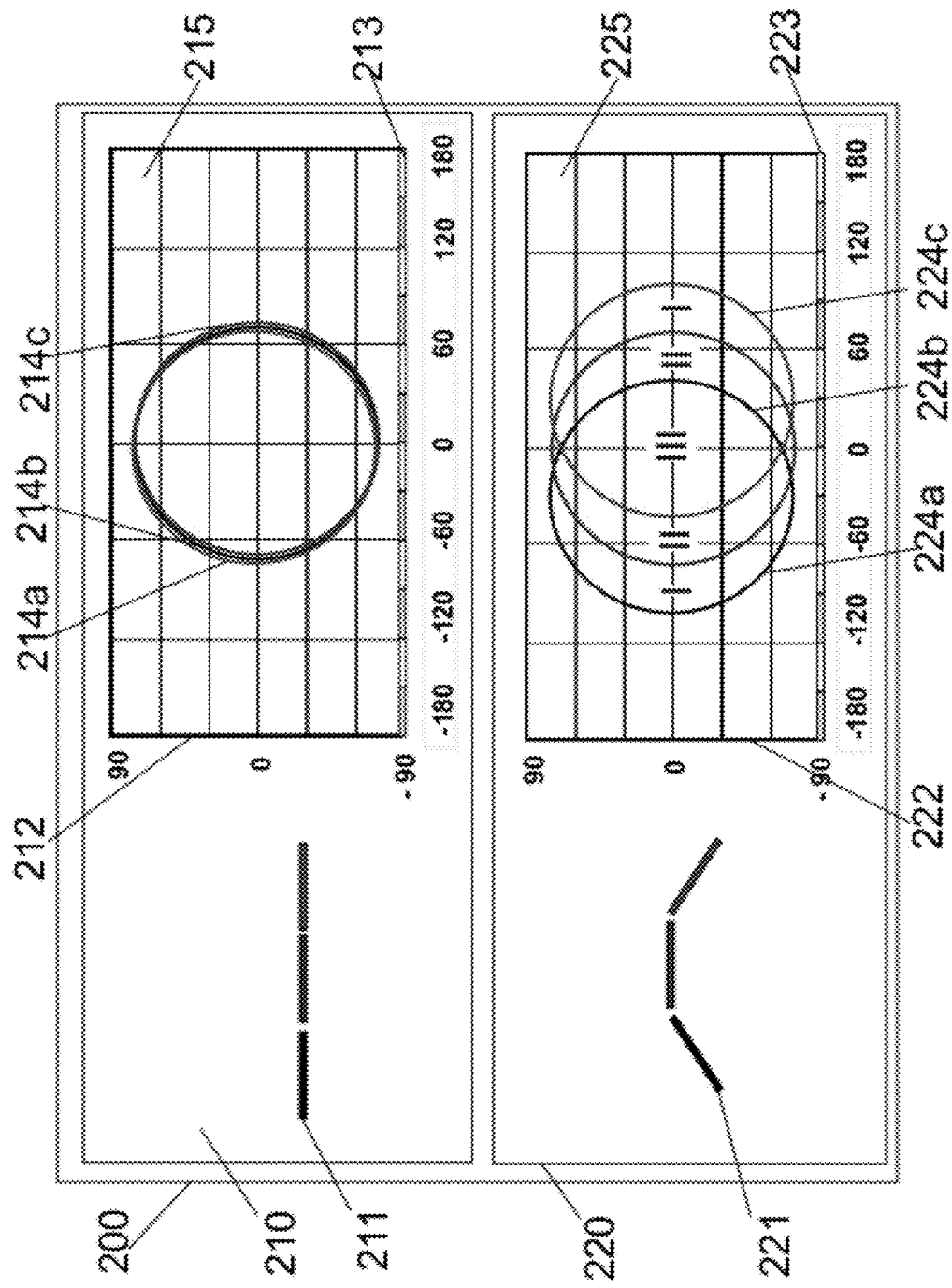
FIG. 2 illustrates the FOVs of array elements for those of a planar array on the left panel and those of a non-planar array on the right panel.

FIG. 2 200 illustrates the FOVs of array elements for those of planar array 211 on upper panel 210 and those of non-planar array 221 on lower panel 220. Markings 211 on panel 210 depict the side view of the planar array. The array consists of 3 identical elements, indicated by 3 bars. The corresponding FOVs of these elements are illustrated in three circles 214a, 214b, 214c. Vertical axes 212 and horizontal axes 213 depict the elevation and azimuth angles in degrees. These elements are about 0.4λ wide with a 3 dB beamwidth covering about 140° FOV. Panel 210 illustrates that the FOVs of three elements for a planar array are identical and cover the same area. They can be utilized to form beams and steer nulls, with a smaller beamwidth, pointing to any location within the common FOV through proper amplitude and phase weightings. It is also possible to form 3 orthogonal beams, with every individual beam having 2 additional "degrees of freedom" for nulling in relation to the FOV. A set of orthogonal beams utilize a characteristic in that one beam always peaks at a null of the other beams Lower panel 220 of FIG. 2 200 shows three identical FOVs that are pointed in various directions associated with the surface normal of the element locations 221. The drawings 221 on the lower left panel depict the side view of the non-plannar array. The array consists of 3 identical elements, indicated by 3 black bars. The corresponding FOVs 224a and 224b and 224c of these elements are illustrated in three circles. The vertical axes 222 and the horizontal axes 223 depict the elevation and azimuth angles in degrees. These elements are about 0.4λ wide with a 3 dB beamwidth covering about 140° FOV. Thus, the array antenna coverage area (I+II+III) 224 is enlarged, but the degrees of freedom are reduced. Only a small portion the FOVs from the three elements, indicated by "III", are overlapped. Areas indicated by "II" are covered by two elements, while most areas are only covered by one element, "I." The area indicated by "III" will exhibit a full capacity of three degrees of freedom for beam shaping and null steering. Additionally, there will be reduced beam shaping and null steering capacity at regions indicated by "II" and very little beam shaping and null steering capability in the "I" regions.

Figure 3A:
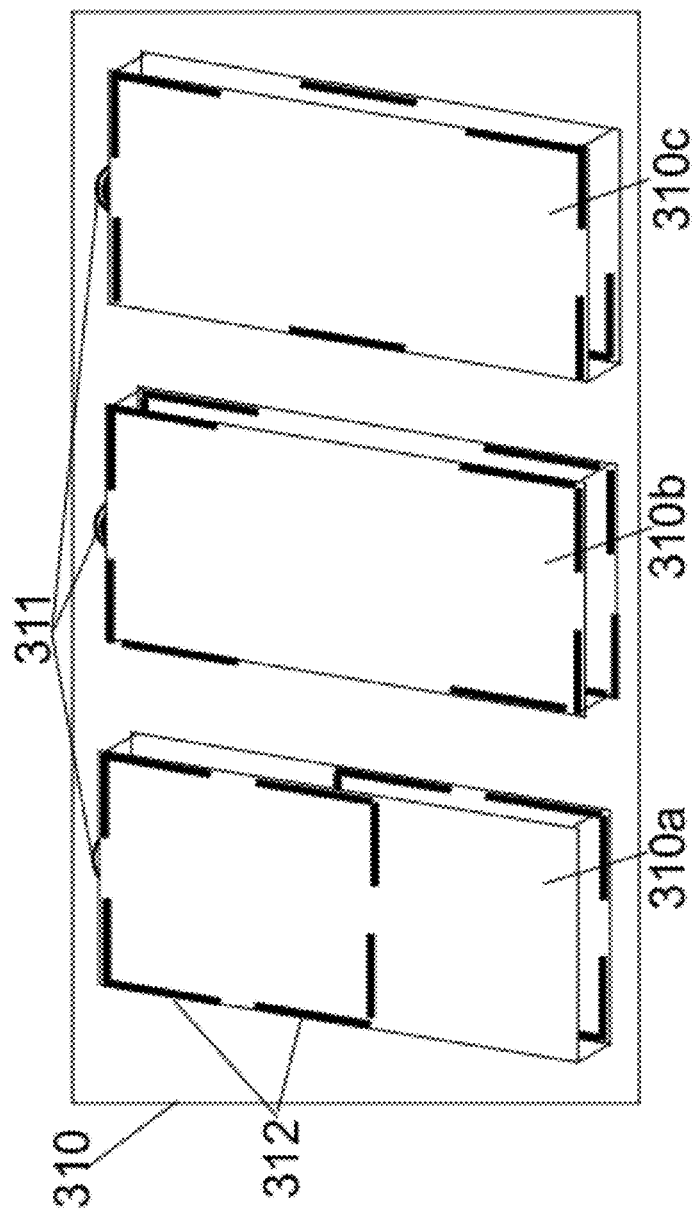
FIG. 3*a* illustrates various options of elements with linear edges for handheld devices.

FIG. 3A 310 illustrates various antenna elements on a handheld device. There are three options 310*a*, 310*b* and 310*c*, each with 9 different element positions and shapes. All options feature one ceramic radiator 311 mounted in the center of the top surface of the handheld devices. Other element 312 candidates include folded dipoles, 2-D L-shaped meandered dipoles, or 3-D short dipoles with L-cross sections. The low profile elements 311 and 312 may be conformal or placed on 1-D curved surfaces including flat areas. The aperture sizes, number of elements, element locations, and element orientations are keys to the performance of a distributed array.

Figure 3B:
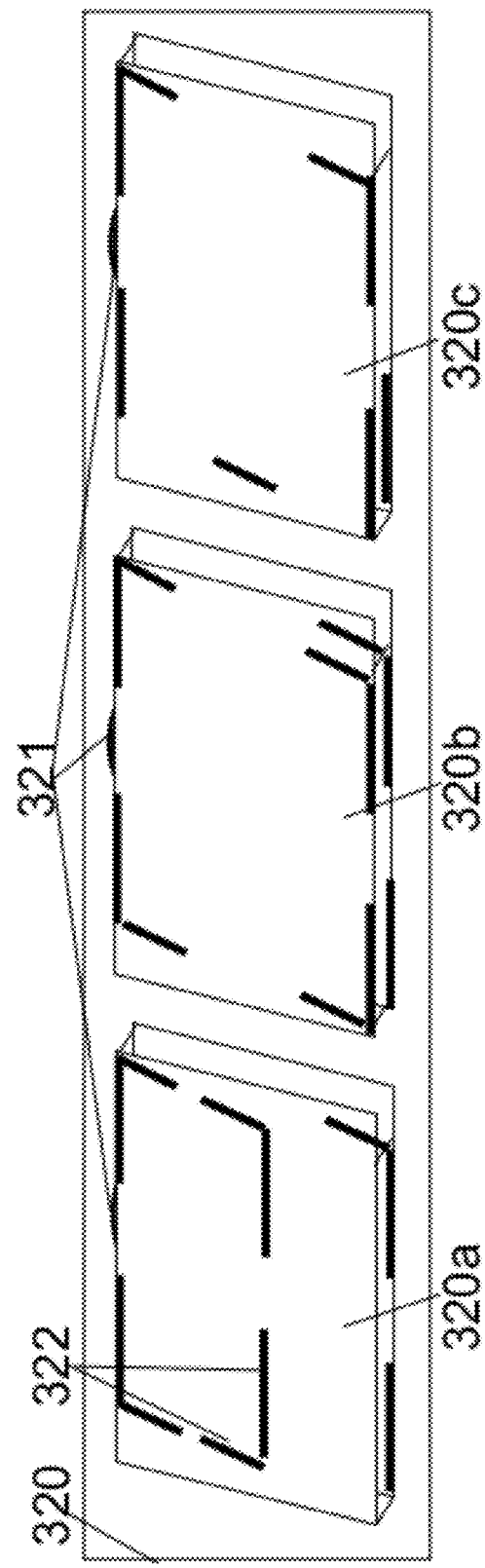
FIG. 3*b* illustrates various options of elements with linear edges for laptop devices.

FIG. 3B 320 illustrates various antenna elements on a laptop computer device. There are three options 320*a*, 320*b* and 320*c*, each with 9 different element positions and shapes. All options feature one ceramic radiator mounted 321 in the center of the top surface of the devices. Other element candidates include folded dipoles, 2-D L-shaped meandered dipoles, or 3-D short dipoles with L-cross sections. The low profile elements 321 and 322 may be conformal or placed on 1-D curved surfaces including flat areas. The aperture sizes, number of elements, element locations, and element orientations are keys to the performance of a distributed array.

Figure 4A:
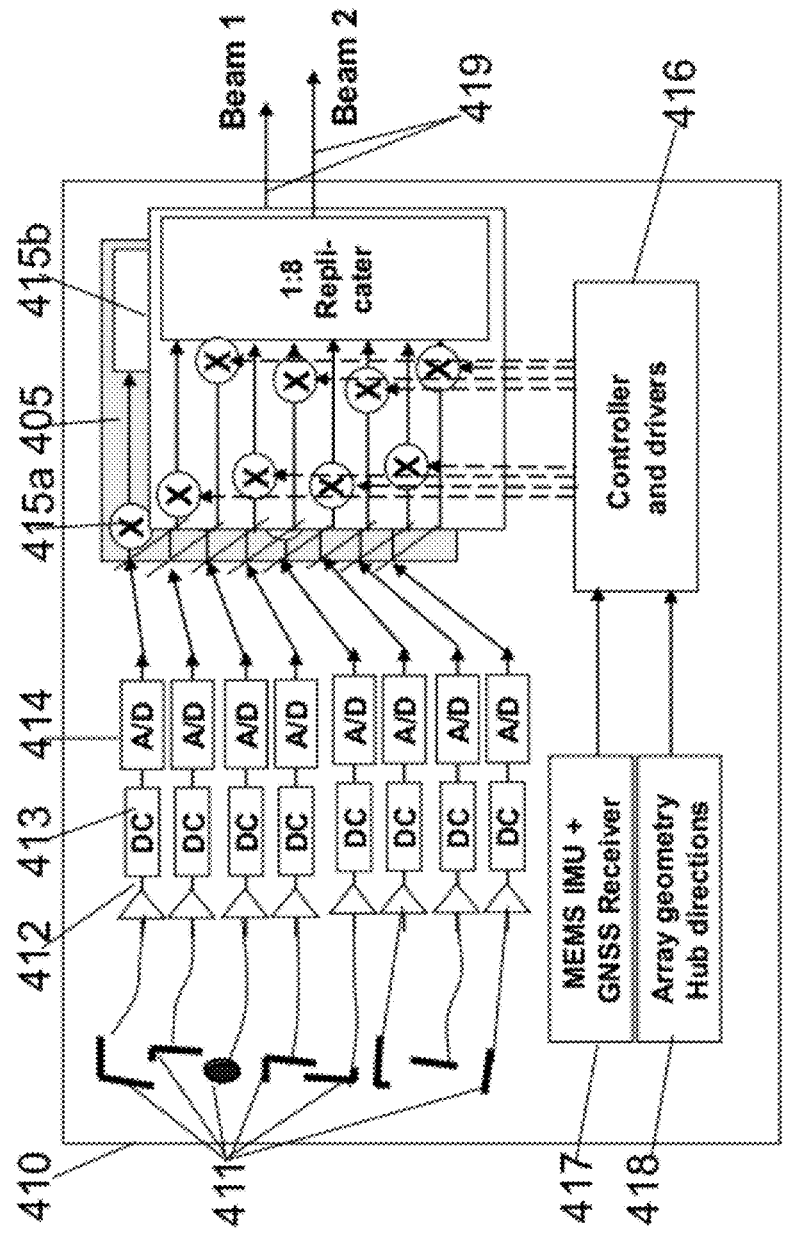
FIG. 4a illustrates a 8-to-2 configurable Rx beam forming network featuring digital beam forming (DBF) network for portable handheld and laptop devices.

FIG. 4A 410 illustrate a method of combining 8 individual radiating elements 411 of distributed arrays shown in FIGS. 3A 310 and 3B 320 in receiving mode via a 8-to-2 digital beam forming (DBF) processors 405 to form two individual beams 419. Received signals by an array element 411 is "conditioned" by low noise amplifier (LNA) 412, filtered by a band pase-filter (BPF) (not shown) and frequency down-converted by a down converter (DC) 413, and digitized by an A-to-D converter (N/D) 414 before being sent to the 8-to-2 DBF processors 405, consisting of multiplications 415*a* and summations stages 415*b*. The multiplicants are digitized received signals and the multipliers are the beam weight vector (BWV) components supplied by the controller and drivers 416. BWVs are calculated by the controllers based the device orientations and positions provided by a unit with MEMS IMU and GNSS recievers 417 or equivalent functions, and information on array geometries and hub locations recorded in local memory units 418. For a 8 element array, the BWVs for different beams will feature 8 complex components. When 4 elements are not selected for a beam, the associated BWV components will be set to zero. The resulting Rx beam effectively is contributed by the 4 remaining (or selected) array elements.

Figure 4B:
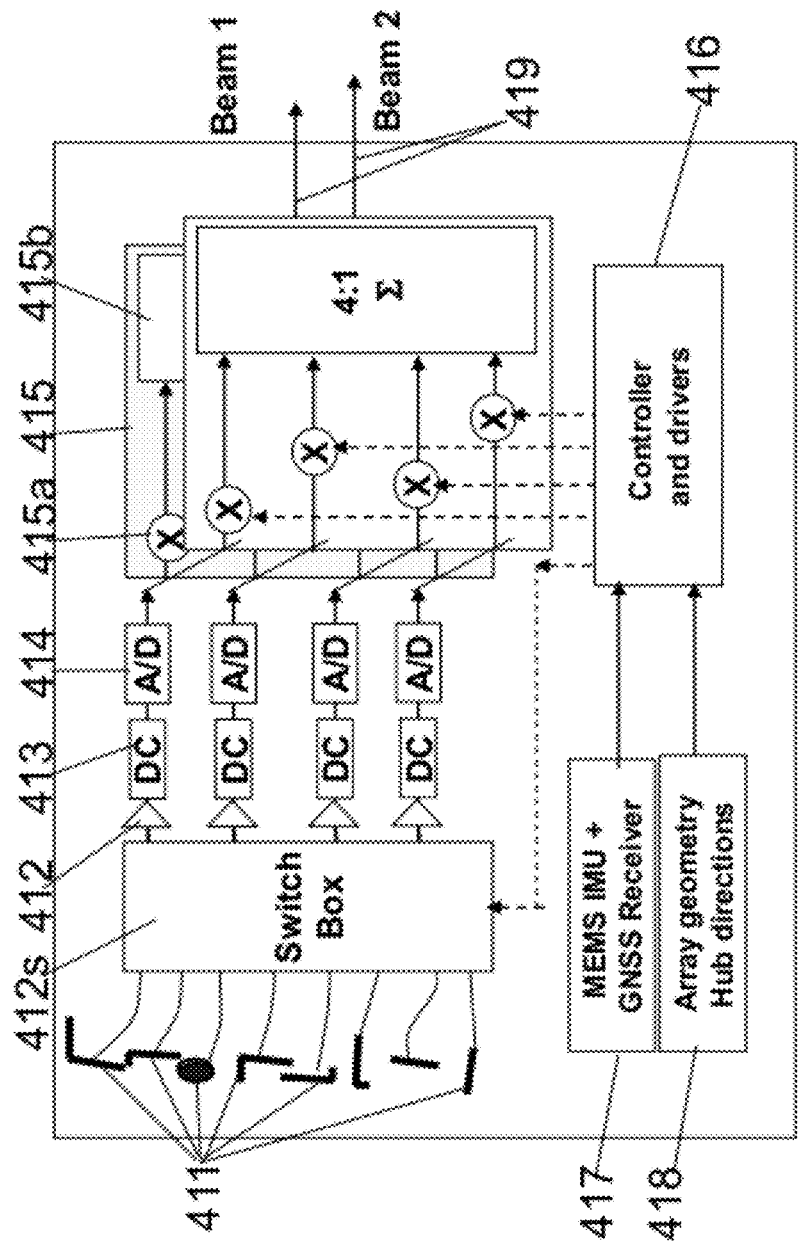
FIG. 4b illustrates a 8-to-2 configurable Rx beam forming network featuring a low loss 8-to-4 switch box before low-noise-blocks (LNB's) and a 4-to-2 digital beam forming (DBF) network for portable handheld and laptop devices.

FIG. 4B illustrate a method of selecting 4 out of 8 receiving elements and combining the selected 4 individual radiating elements 411 of distributed arrays shown in FIGS. 3A 310 and 3B 320 in receivng (Rx) mode via a RF 8-to-4 switching box 412*s* and a 4-to-2 Rx digital beam forming (DBF) processor 415 to form two individual beams 419. Received signals by an array element 411 are sent to a 8-to-4 switch box 412*s*, and the 4 outputs are "conditioned" by a low noise amplifier (LNA) 412, filtered by a band pass-filter (BPF) (not shown) and frequency down-converted by a down converter (DC) 413, and digitized by a A-to-D converter (A/D) 414 before sent to the 4-to-2 Rx DBF processors 415, consisting of multiplications 415*a* and summations stages 415*b*. The multiplicants are digitized received signals and the multipliers are the beam weight vector (BWV) components supplied by the controller and drivers 416. BWVs are calculated by controllers 416 based on device orientation and positions provided by a unit with MEMS IMU and GNSS receivers 417 or equivalent functions, and information on array geometries and hub locations recorded in local memory units 418. For a 4 element array, the BWVs for different beams will feature 4 complex components. The low insertion loss switch box is placed before the low noise blocks (LNBs), conisting of LNAs 412 and frequency down converters 413. Different selections of array elements for various beams are dynamically carried out in controller 416.

Figure 4C:
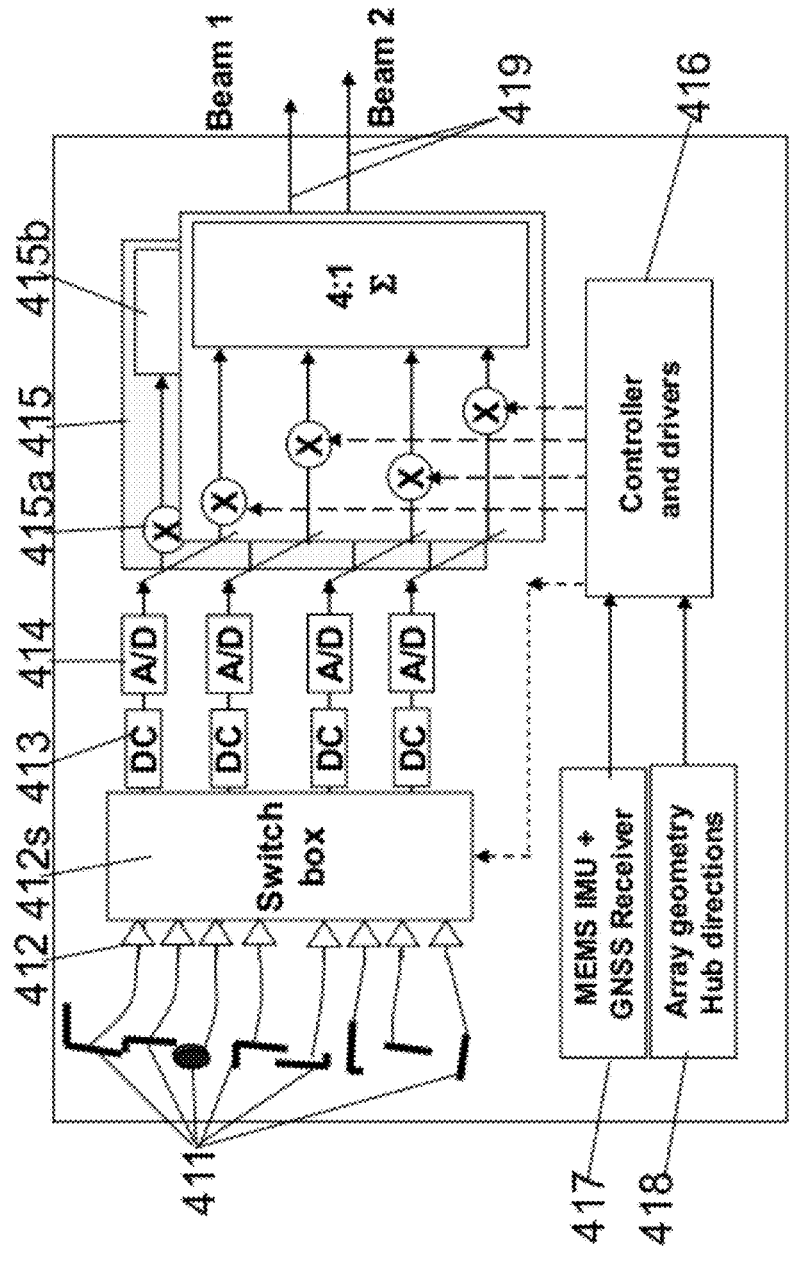
FIG. 4c illustrates a 8-to-2 configurable Rx beam forming network featuring a 8-to-4 switch box after low-noise-amplifiers (LNA's) and a 4-to-2 digital beam forming (DBF) network for portable handheld and laptop devices.

FIG. 4C illustrate a method of selecting 4 out of 8 receiving elements and combining selected individual radiating elements 411 of distributed arrays shown in FIGS. 3A 310 and 3B 320 in receiving (Rx) mode via a RF 8-to-4 switching box 412*s* and a 4-to-2 Rx digital beam forming (DBF) processor 415 to form two individual beams 419. Received signals by an array element 411 are "conditioned" by a bank of low noise amplifiers (LNAs) 412, The outputs are connected to a 8-to-4 switch box. Each of the four outputs of the switch box is filtered by a band pase-filter (BPF) (not shown) and frequency down-converted by a down converter (DC) 413, and digitized by an A-to-D converter (A/D) 414 before sent to the 4-to-2 Rx DBF processors 415, consisting of multiplications 415*a* and summations stages 415*b*. The multiplicants are digitized received signals and the multipliers are the beam weight vector (BVVV) components supplied by the controller and drivers 416. BWVs are calculated by controllers 416 based on device orientation and positions provided by the unit with a unit of Micro Electro Mechanical Sensor (MEMS) Inertial Measurement Unit (IMU) and Global naviagtion Satellite Systems (GNSS) recievers 417 or equivalent functions, and information on array geometries and hub locations recorded in local memories 418. For a 4 element array, the BWVs for different beams will feature 4 complex components. The low insertion loss switch box is placed after the low noise amplifers (LNAs) 412 and before a frequency down converters 413. Different selections of array elements for various beams are dynamically carried out in the controller 416.

Figure 4D:
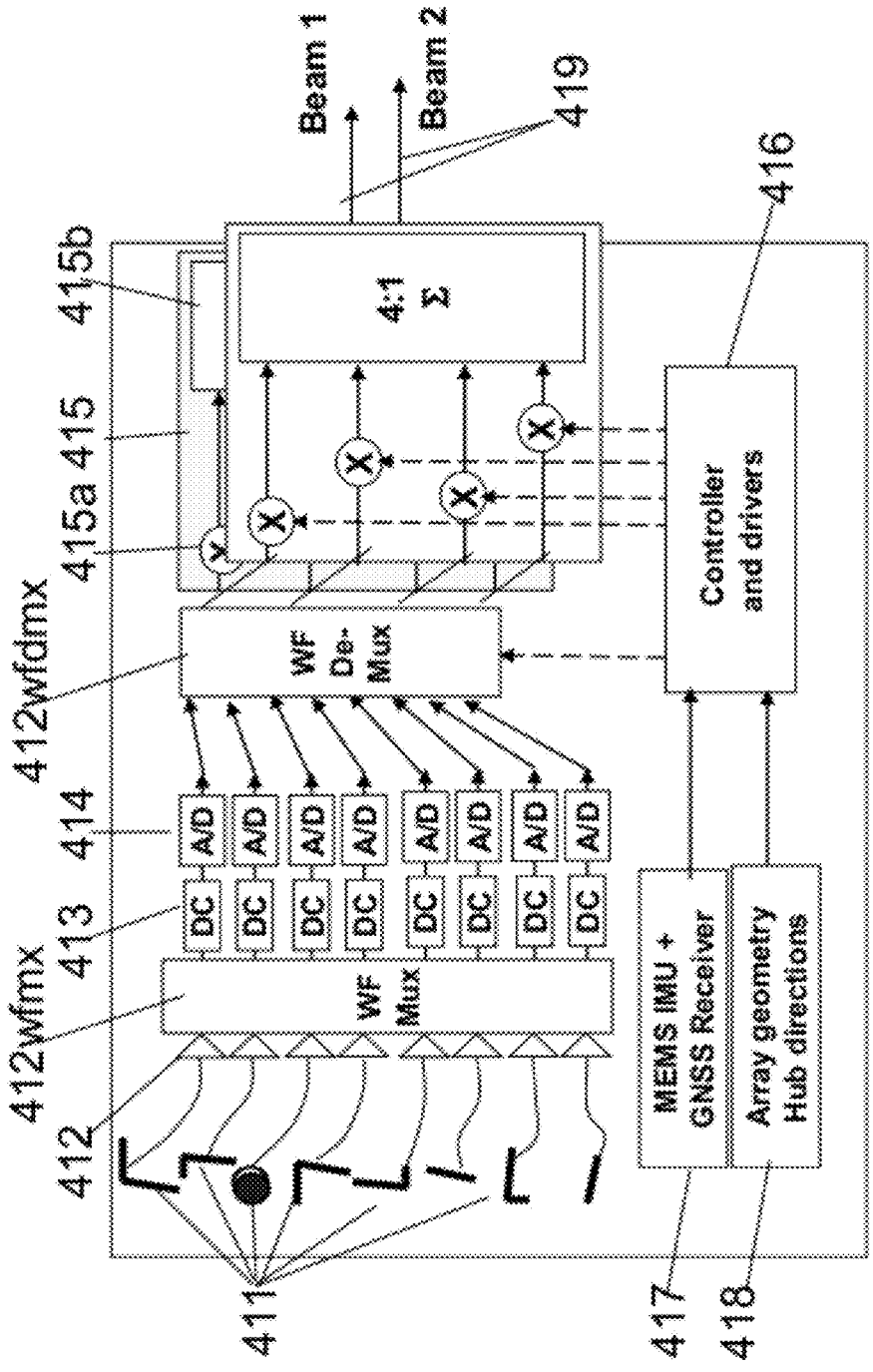
FIG. 4d illustrates a 8-to-2 configurable Rx beam forming network featuring a wavefront (WF) multiplexing (muxing) device after low-noise-amplifiers (LNA's) and a digital WF de-muxing device and a 4-to-2 digital beam forming (DBF) network for portable handheld and laptop devices.

FIG. 4D illustrate another method of selecting 4 out of 8 receiving elements and combining the selected 4 individual radiating elements 411 of distributed arrays shown in FIGS. 3A 310 and 3B 320 in receiving (Rx) mode via a RF 8-to-8 wavefront multiplexer (WF Muxer) 412*wfmx*, a 8-to 4 digital programmable WF demuxer 412*wfdmx*, and a 4-to-2 Rx digital beam forming (DBF) processors 415 to form two individual beams 419. Received signals by array element 411 are "conditioned" by a bank of low noise amplifiers (LNAs) 412. The outputs are connected to a 8-to-8 WF muxer 412*wfmux*. Each of the eight outputs of the WF muxer is filtered by a band pase-filter (BPF) (not shown) and frequency down converted by a down converter (DC) 413, and digitized by a A-to-D converter (A/D) 414 before sent to a digital 8-to-4 WF demuxer 412*wfdmx* followed by a 4-to-2 Rx DBF processors 415, consisting of multiplications 415*a* and summations stages 415*b*. The multiplicants are digitized received signals and the multipliers are the beam weight vector (BWV) components supplied by the controller and drivers 416. BWVs are calculated by the controllers 416 based the device orientations and positions provided by a unit with MEMS IMU and GNSS receivers 417 or equivalent functions, and information on array geometries and hub locations recorded in local memory units 418. For a 4 element array, the BWVs for different beams will feature 4 complex components. The low insertion loss WFmuxer 412*wfmx* is placed after the low noise amplifers (LNAs) 412 and before frequency down converters 413. Different selections of array elements for various beams are dynamically carried out in the controller 416 by reconfiguring the digital WF demuxer 412*wfdmx*.

Figure 4E:
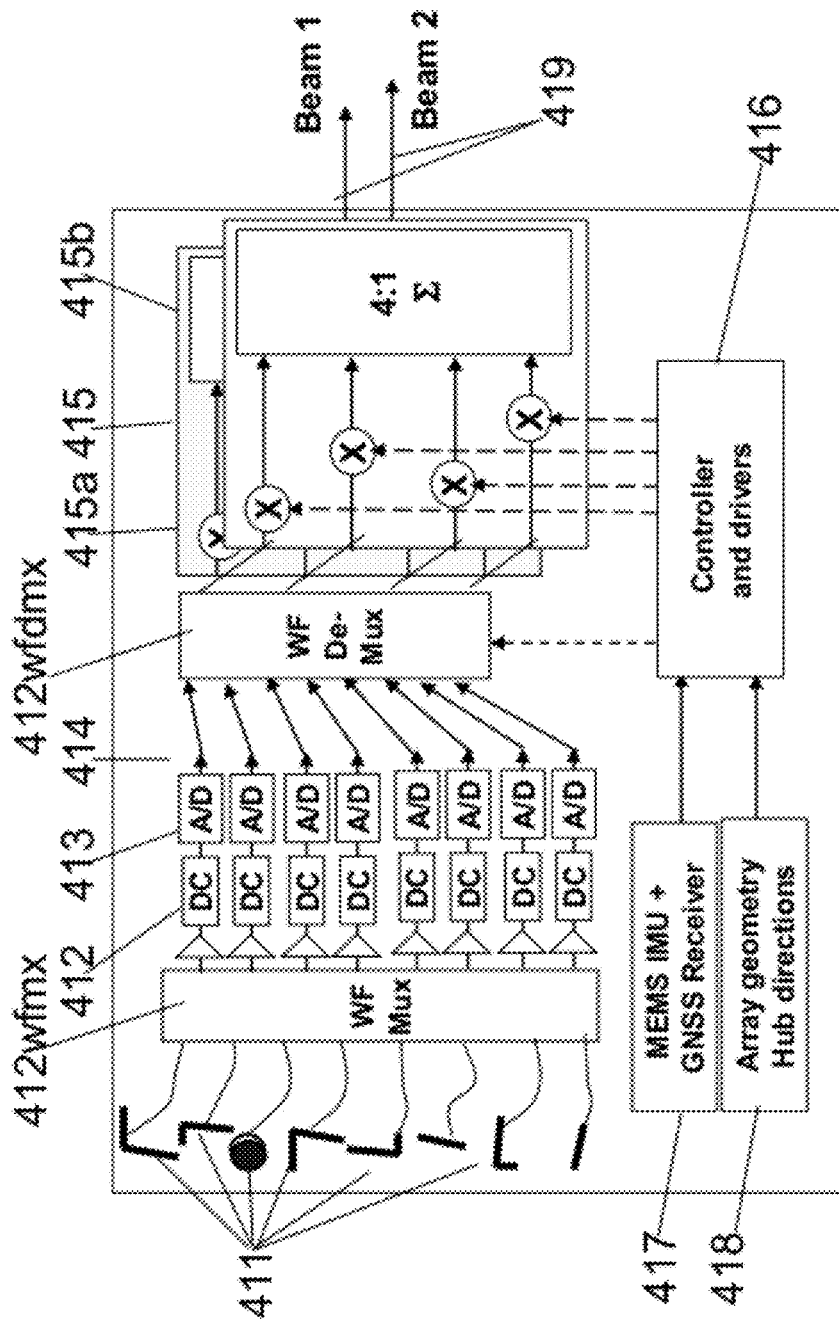
FIG. 4e illustrates a 8-to-2 configurable Rx beam forming network featuring a wavefront (WF) multiplexing (muxing) device before low-noise-blocks (LNB's) and a digital WF de-muxing device and a 4-to-2 digital beam forming (DBF) network for portable handheld and laptop devices.

FIG. 4E illustrate another method of selecting 4 out of 8 receiving elements and combining the selected 4 individual radiating elements 411 of distributed arrays shown in FIGS. 3A 310 and 3B 320 in receivng (Rx) mode via a RF 8-to-8 wavefront multiplexer (WF Muxer) 412*wfmx*, a 8-to 4 digital programmable WF demuxer 412*wfdmx*, and a 4-to-2 Rx digital beam forming (DBF) processors 415 to form two individual beams 419. Received signals by an array element 411 are connected to a 8-to-8 WF muxer 412*wfmux* Each of the eight outputs of the WF muxer are "conditioned" by a LNB consisting of a low noise amplifier (LNA) 412, followed by a band-pass filter (BPF) (not shown) and frequency down-converted by a down converter (DC) 413. The output from an LNB is digitized by a A-to-D converter (A/D) 414 before sent to a digital 8-to-4 WF demuxer 412*wfdmx* cascaded by a 4-to-2 Rx DBF processors 415; which consisting of multiplications 415*a* and summations stages 415*b*. The multiplicants are digitized received signals and the multipliers are the beam weight vector (BWV) components supplied by the controller and drivers 416. BWVs are calculated by the controllers 416 based the device orientations and postions provided by a unit with MEMS IMU and GNSS receivers 417 or equivalent functions, and information on array geometries and hub locations recorded in local memory units 418. For a 4 element array, the BWVs for different beams will feature 4 complex components. The low insertion loss WFmuxer 412*wfmx* is placed before the low noise blocks (LNBs) 412 and 413. Different selections of array elements for various beams are dynamically carried out in the controller 416 by reconfiguring the digital WF demuxer 412*wfdmx*.

The configurations between the digital 8-to-8 WF muxers and the associated 8-to-8 WF demuxers consist of banks of A/Ds are identical to those of smart A/D modules patent-filed by SDS [10]. One of the advantages of using the smart A/D modules is to provide flexibility of number of inputs and enhance dynamic range.

Figure 4F:
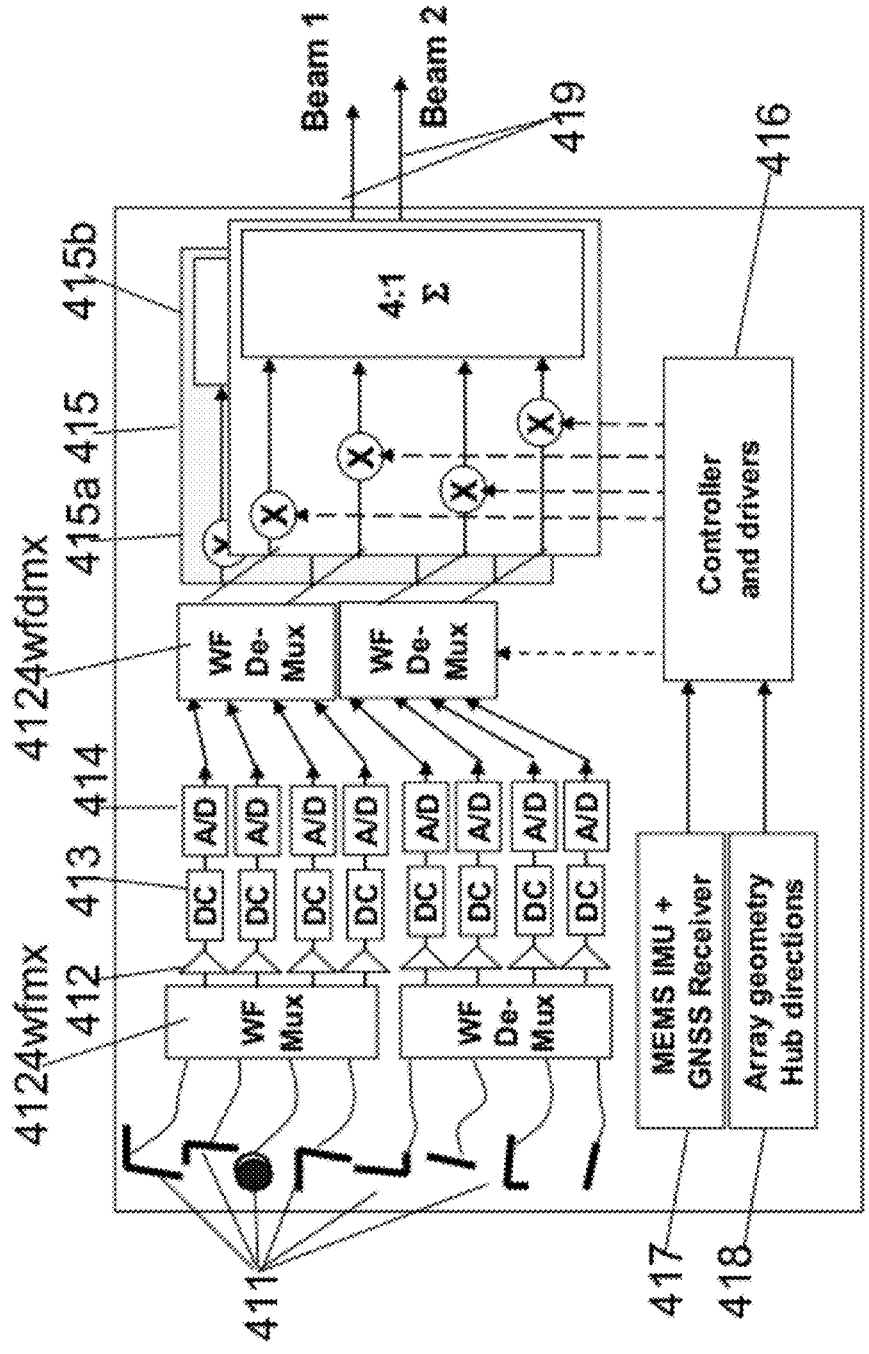
FIG. 4f illustrates a 8-to-2 configurable Rx beam forming network featuring two wavefront (WF) multiplexing (muxing) devices before low-noise-blocks (LNB's) and two digital WF de-muxing devices and a 4-to-2 Rx digital beam forming (DBF) network for portable handheld and laptop devices.

FIG. 4F illustrate another method of selecting 4 out of 8 receiving elements and combining the selected 4 individual radiating elements 411 of distributed arrays shown in FIGS. 3A 310 and 3B 320 in receiving (Rx) mode via two RF 4-to-4 wavefront multiplexer (WF Muxer) 4124*wfmx*, two 4-to-2 digital programmable WF demuxer 4124*wfdmx*, and a 4-to-2 Rx digital beam forming (DBF) processors 415 to form two individual beams 419. Received signals by an array element 411 are connected to one of the two 4-to-4 WF muxers 4124*wfmux*. Each of the four outputs of a WF muxer is "conditioned" by a LNB consisting of a low noise amplifier (LNA) 412, followed by a band-pass filter (BPF) (not shown) and frequency down converted by a down converter (DC) 413. The output from an LNB is digitized by a A-to-D converter (A/D) 414 before sent toone of the two digital 4-to-2 WF demuxer 412*wfdmx* cascaded by a 4-to-2 Rx DBF processors 415; which consisting of multiplications 415*a* and summations stages 415*b*. The multiplicants are digitized received signals and the multipliers are the beam weight vector (BWV) components supplied by the controller and drivers 416. BWVs are calculated by the controllers 416 based the device orientations and positions provided by a unit of the MEMS IMU and GNSS 417 or equivalent functions, and information on array geometries and hub locations recorded in local memory units 418. For a 4 element array, the BWVs for different beams will feature 4 complex components. The two low insertion loss WFmuxers 4124*wfmx* are placed before the low noise blocks (LNBs) 412 and 413. Different selections of array elements for various beams are dynamically carried out in the controller 416 by reconfiguring the digital WF demuxer 4124*wfdmx*.

Figure 4G:
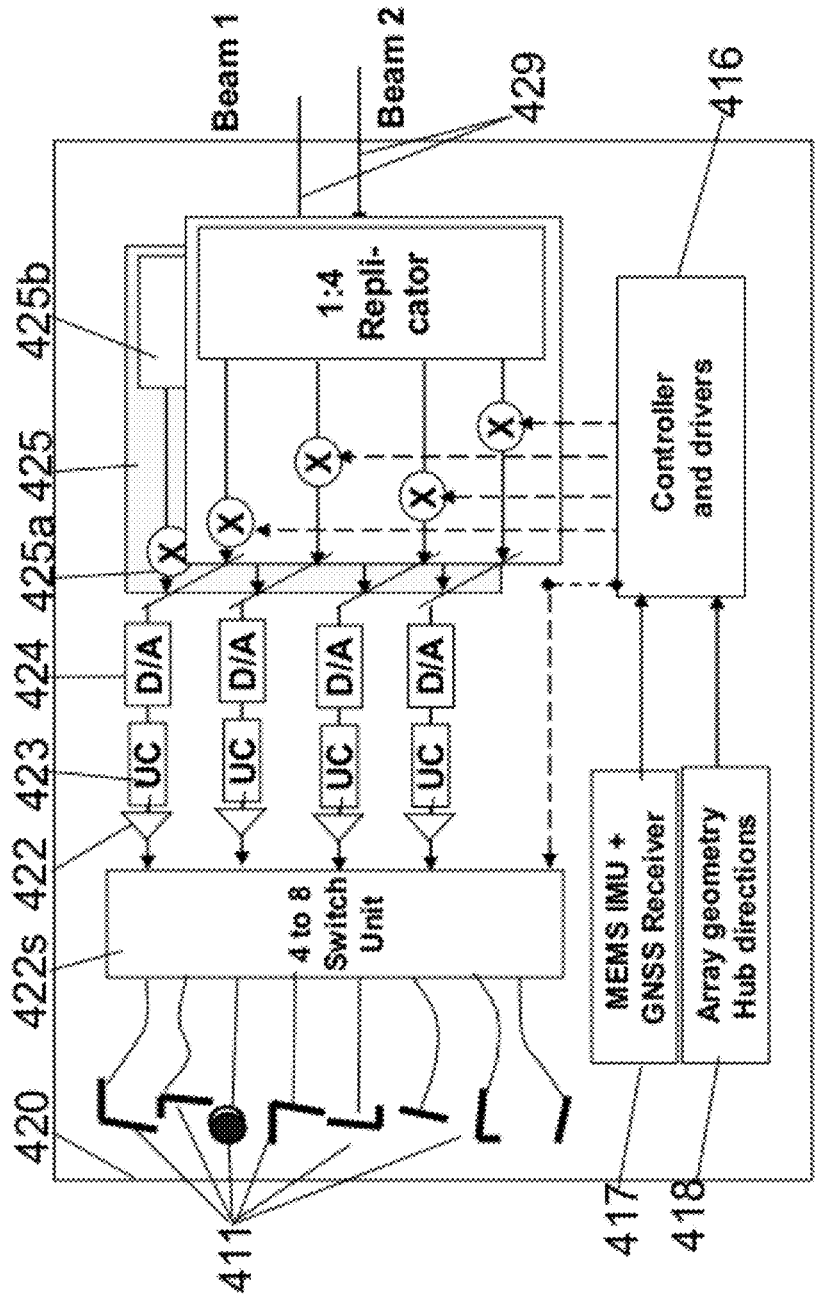
FIG. 4g illustrates a 2-to-8 configurable Tx beam forming network featuring a 2-to-4 Tx digital beam forming (DBF) network and a 4-to-8 RF switching unit after block up-converters (BUCs) for portable handheld and laptop devices.

FIG. 4G 420 illustrates a method of forming two individual beams 429 in transmitting mode using 4 of 8 available individual radiating elements 411 of distributed arrays shown in FIGS. 3A 310 and 3B 320 via a 2-to-4 Tx digital beam forming (DBF) 425 network and a low loss RF 4-to-8 switch unit 422*s*. Signals 429 to be transmitted are processed by the Tx DBF processors 425 in which each beam forming process consisting of replication 425*b* and multiplication 425*a* stages. The multiplicants are replicated digitized signals to be transmitted and the multipliers are the beam weight vector (BWV) components supplied by the controller and drivers 426. BWVs are calculated by the controllers 426 based the device orientations and positions provided by the unit with MEM IMU and GNSS receivers 427 or equivalent functions, and information on array geometries and hub locations recorded in local memory units 428. The weighted signals for individual elements for the two transmitting beams are summed together in the transmitted DBF 425 before converted to analogue formats by digital-to analogue (D/A) converters 424. These signals are then frequency upconverted by upconverter (UC) 423 and amplified by power amplifiers 422. The 4 amplified signals are sent to 4 selected elements from the 8 available elements 421. The selection mechanism, controlled by the controller 426, is a low loss RF 4-to-8 switch unit 422*s*. The outputs of the switching unit are connected to the 8 individual elements 421. The radiations of 4 amplified signals by the selected elements are combined in the farfield.

Figure 4H:
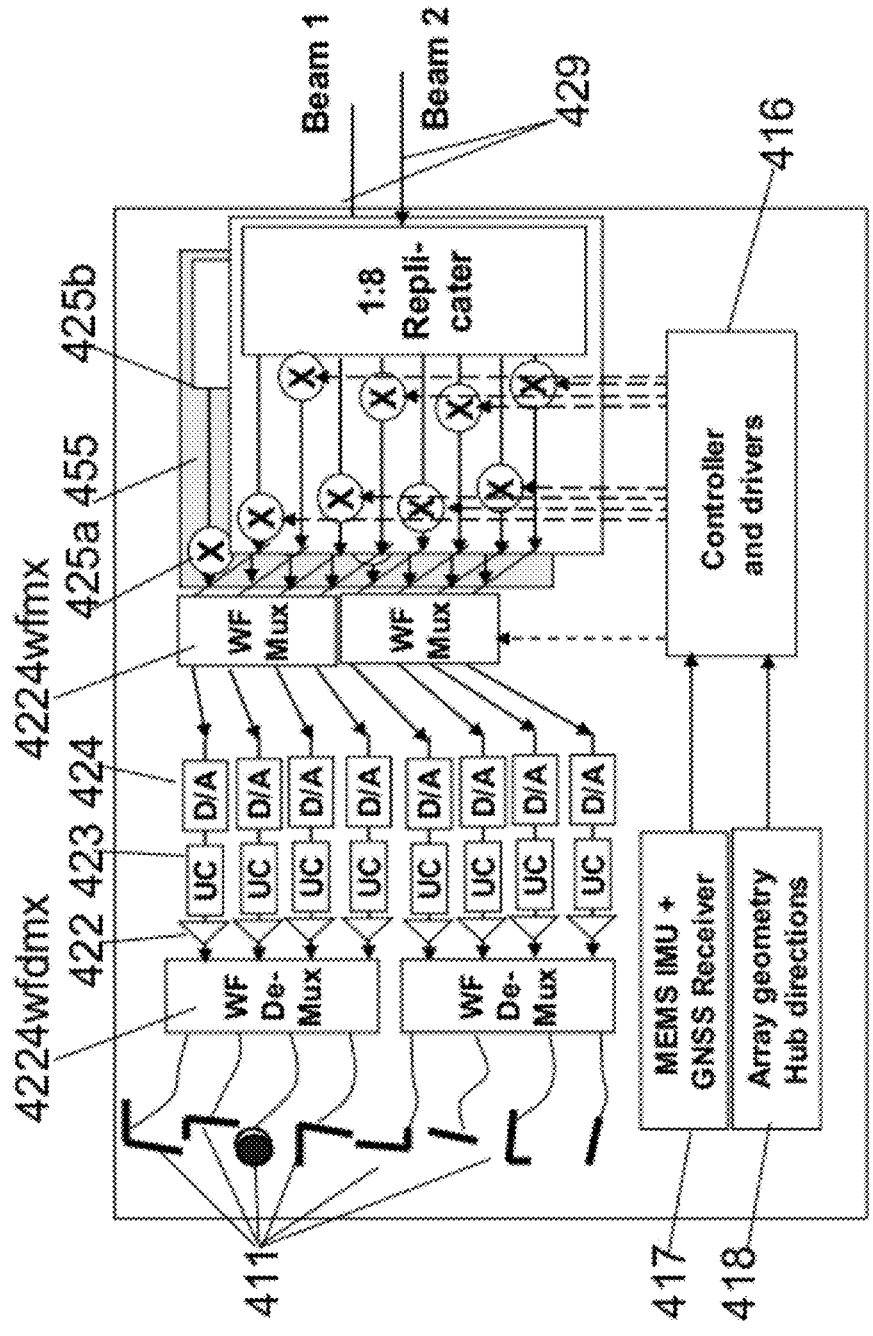
FIG. 4h illustrates a 2-to-8 configurable Tx beam forming network featuring a 2-to-8 Tx digital beam forming (DBF) network and two 4-to-4 digital WF muxers, as well as two corresponding 4-to-RF WF demuxers placed after block up-converters (BUCs) for portable handheld and laptop devices.

FIG. 4H illustrates a method of forming two individual beams 429 in transmitting mode using 4 of 8 available individual radiating elements 411 of distributed arrays shown in FIGS. 3A 310 and 3B 320 via a 2-to-8 Tx digital beam forming (DBF) 455 network, two digital WF muxers 4224*wfmx* featuring 4-inputs and 4-outputs, and two RF WF demuxers 4224*wfdmx* also featuring 4-inputs and 4-outputs. Signals 429 to be transmitted are processed by the Tx 2-to-8 DBF processors 455 in which each beam forming process consists of a replication 425*b* and a multiplication 425*a* stages. The multiplicants are replicated digitized signals to be transmitted and the multipliers are the beam weight vector (BWV) components supplied by the controller and drivers 416. BWVs are calculated by the controllers 416 based the device orientations and positions provided by a unit with MEMS IMU and GNSS receivers 417 or equivalent functions, and information on array geometries and hub locations recorded in local memories 418. The weighted signals for individual elements for the two transmitting beams are summed together in the transmitted DBF 455 and become the inputs of the digital WF muxers 4224*wfmx*. The outputs from the digital WF muxers 4224*wfmx* are converted to analogue formats by digital-to analogue (D/A) converters 424, and. These signals are then frequency upconverted by by upconverter (UC) 423, and amplified by power amplifiers 422. Two sets of 4 amplified signals are sent to the inputs of the two 4-to-4 WF demuxers 4224*wfdmx*, and their outputs are connected to the 8 available elements 411. The selection mechanism, controlled by the controller and drivers 416, is the BWVs for the DBF 455 network.

The configurations between the WF muxers and the associated two WF demuxers consisting of banks of power amplifiers are identical to those of smart PA modules patent-filed by SDS [10,11]. One of advantages of using the smart PA modules is to provide equal loading to all the PAs. The outputs of the WF demuxers 4224*wfdmx* are connected to the 8 individual elements 411. The radiations by the 8 elements 411, amplified by the 2 smart PA modules driven by signals dynamically configured by the 2-to-8 DBF 455, are combined in the farfield accordingly.

Figure 4I:
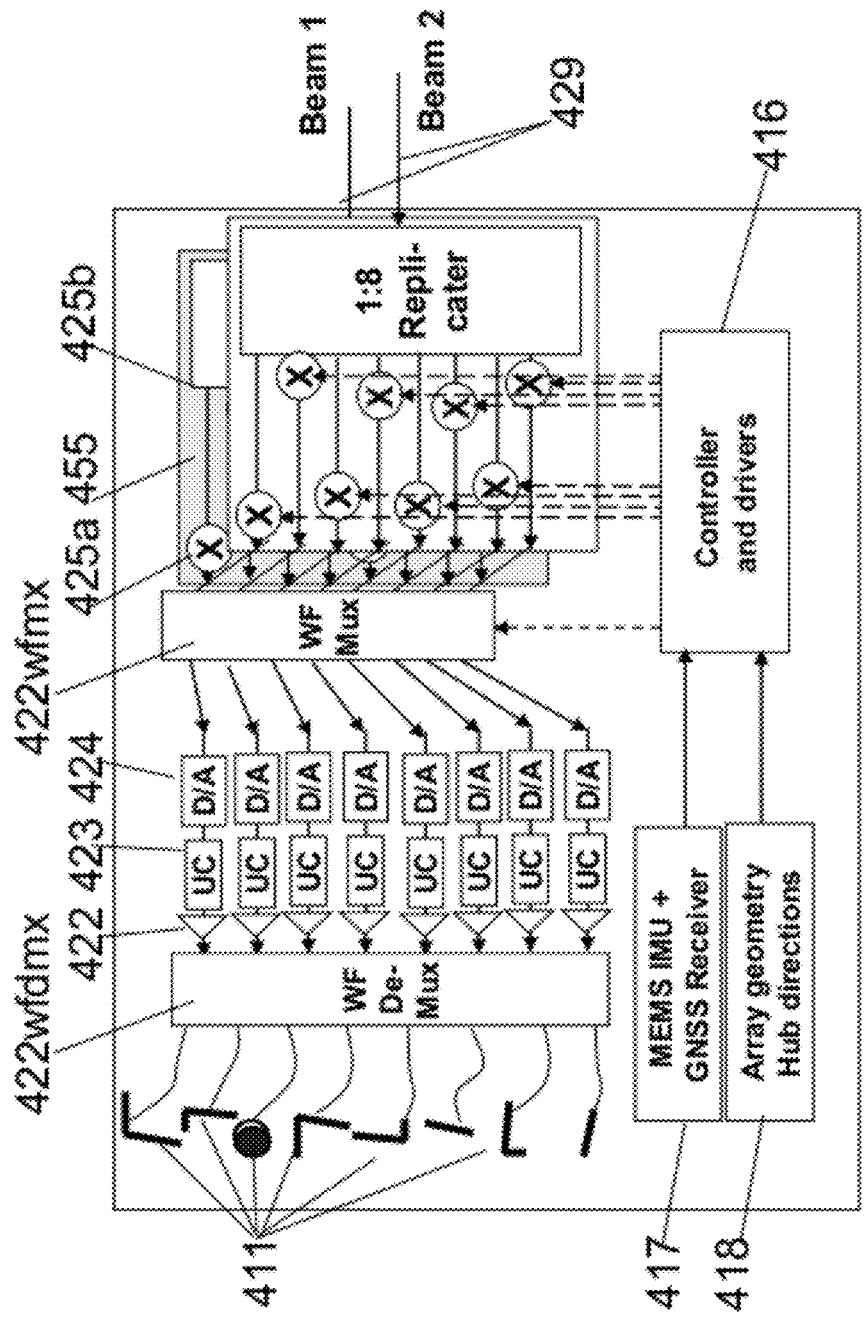
FIG. 4i illustrates a 2-to-8 configurable Tx beam forming network featuring a 2-to-8 Tx digital beam forming (DBF) network and an 8-to-8 digital WF muxer, as well as a corresponding RF 8-8 WF demuxer placed after a bank of 8 block up-converters (BUCs) for portable handheld and laptop devices.

FIG. 4I illustrates a method of forming two individual beams 429 in transmitting mode using 4 of 8 available individual radiating elements 411 of distributed arrays shown in FIGS. 3A 310 and 3B 320 via a 2-to-8 Tx digital beam forming (DBF) 455 network, an 8-to-digital WF muxers 422*wfmx* featuring 8-inputs and 8-outputs, and a 8-to-8 RF WF demuxers 422*wfdmx* also featuring 8-inputs and 8-outputs. Signals 429 to be transmitted are processed by the Tx 2-to-8 DBF processors 455 in which each beam forming process consisting of a replication 425*b* and a multiplications 425*a* stages. The multiplicants are replicated digitized signals to be transmitted and the multipliers are the beam weight vector (BWV) components supplied by the controller and drivers 416. BWVs are calculated by the controllers 416 based on device orientations and positions provided by a unit of MEMS IMU and GNSS receivers 417 or equivalent functions, and information on array geometries and hub locations recorded in local memory units 418. The weighted signals for individual elements for the two transmitting beams are summed together in the transmitted DBF 455 and become the inputs of the digital WF muxers 4224*wfmx*. The 8 outputs are converted to analogue formats by digital-to analogue (D/A) converters 424, then frequency up converted by upconverter (UC) 423, and amplified by power amplifiers 422. The 8 amplified signals are the inputs of the 8-to-8 WF demuxers 422*wfdmx*, and their outputs are connected to the 8 available elements 411. The selection mechanism, controlled by the controller and drivers 416, is the BWVs for the DBF 455 network.

The configurations between the digital 8-to-8 WF muxers and the associated 8-to-8 WF demuxers consisting of banks of power amplifiers are identical to those of smart PA modules patent-filed by SDS [10, 11]. One of the advantages of using the smart PA modules is to provide equal loading to all the PAs. The outputs of the WF demuxers 422*wfdmx* are connected to the 8 individual elements 411. The radiations by the 8 elements 411, amplified by the 2 smart PA modules driven by signals dynamically configured by the 2-to-8 DBF 455, are combined in the farfield accordingly.

FIG. 5A illustrate an alternate cost-effective method of digitizing receiving signals from multiple elements 411 through a single frequency down converter and A/D device 513 before DBF processors 514. The received signals from multiple elements 411 are conditioned first by LNAs 412 and BPFs (not shown). The conditioned received signals delivered to element signal input ports 511 are then combined via an analogue code-division multiplexing processor 512. The corresponding CDM demuxing process is accomplished digitally after A/D in the DBF processors 514 to recover original received signals in base-band. The element selection processing is accomplished in base-band as a part of the DBF processing 514. Some of their beam outputs 515 will be used as diagnostic data for dynamic and autonomous array configuration management.

FIG. 5B illustrate a cost effective alternative method of delivering multiple transmitting beam signals 525 by using multiple beams to select radiating element signal output ports 521. The multi-channel frequency upconversion and conversion to analogue formats from transmitting DBF processor 524 via a single Digital-to-Analog (D/A) device and a signal frequency up-conversion chain 523. The code division multiplexing among transmitting signals for multiple elements are processed digitally in DBF 524, while the CDM demux 522 features RF processing to recover the signals to be transmitted by individual elements 521 in RF after power-amplification (not shown). The element selection processing is accomplished in base-band as a part of the DBF processing 524.

Figure 6A:
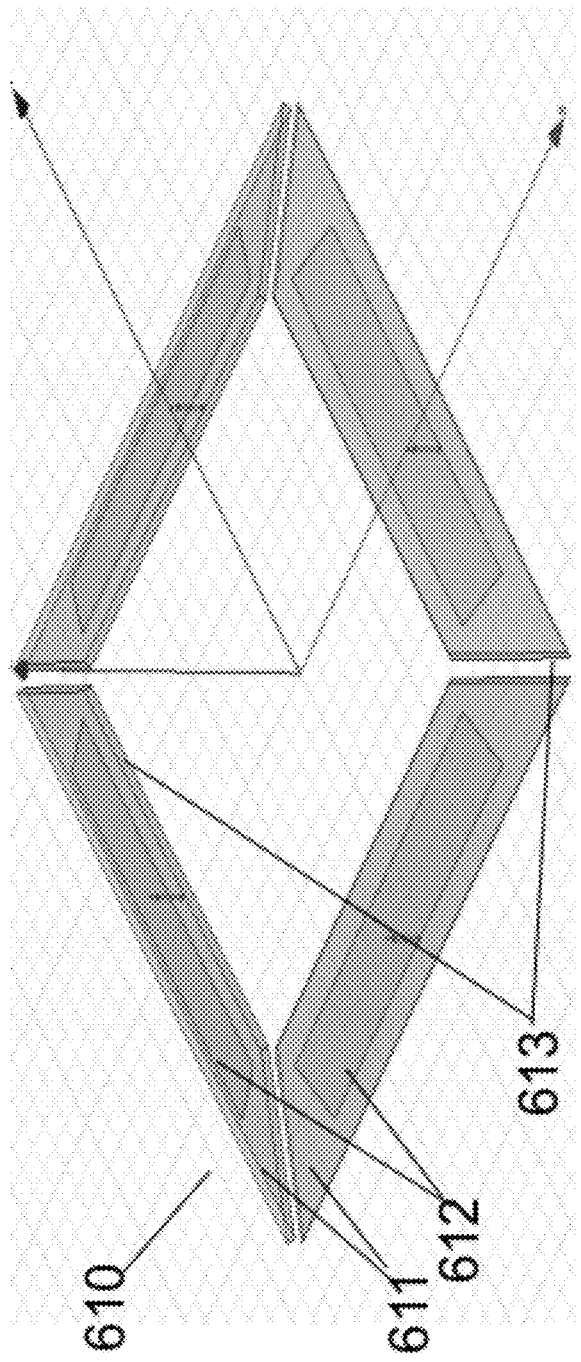
FIG. 6a illustrates a geometry for a 1.5 GHz distributed array. The four 4 small elements are microstrip dipoles with ground planes orinted in various directions.
Figure 6B:
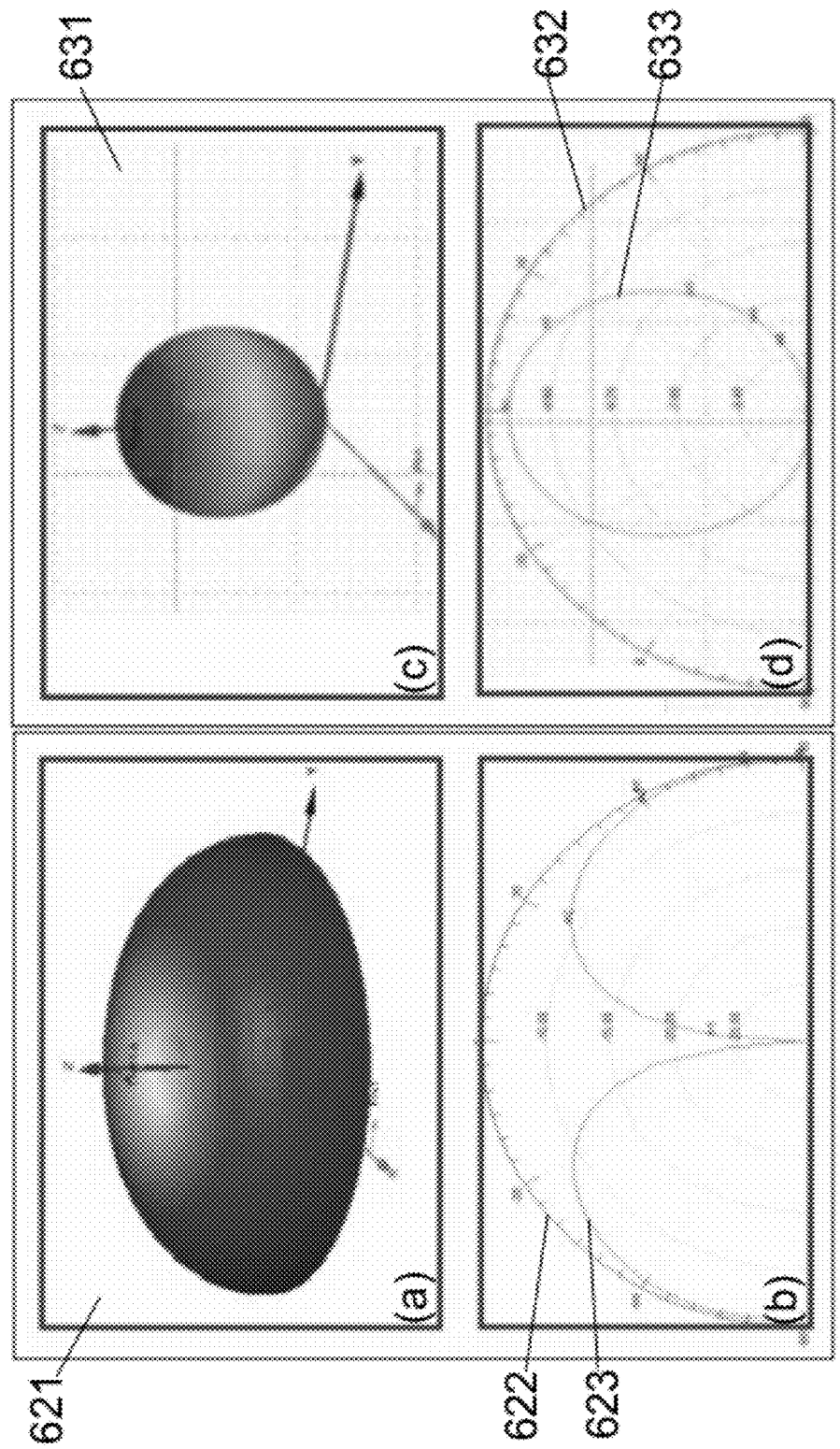
FIG. 6b illustrates two radiation patterns with two different beam weighting vectors (BWV).

FIG. 6 depicts simulated results of a distributed array. The weighting in the DBF, referred to as beam weight vectors (BWV), are generated by a pattern optimization process. FIG. 6A and FIG. 6B illustrate an example of two unique radiation patterns from the same distributed array on the surface of a docking station, which is about 2"×2"×¼".

FIG. 6A 610 illustrates a geometry for a 1.5 GHz distributed array. The four 4 small elements 612 are printed microstrip dipoles on dielectic substrates 611 with ground planes 613. These elements 612 are oriented in various directions. The dielectric constant for the substrates is roughly 10 with a very good loss tangent. They are on a portion of a pyramid shaped structure, with tilting angles of ~30° above the horizontal. The distances between the diagonal corners are about a quarter of wavelength in free space. As indicated, the elements on opposite sides of the pyramid are with the same polarization but are "built" in opposite directons or out of phase by 180° spatially.

The upper left panels 621 of FIG. 6B illustrates a half "donut" shaped radiation pattern from 4 element distributed array 610 controlled by a unique beam weighting vectors (BWV). The 4 components of the BWV are identical. As a result, the received signals from the 4 antenna elements are added in phase. The low left panel depicts two planar cuts of the shaped radiation pattern 621, one in elevation 622 and the other in azimuth 623. The shaped beam 621 features the following unique characteristics:
  (1) a "scalar" beam, independent of polarization,
  (2) a deep null at boresight,
  (3) omnidirectionality in azimuth, and
  (4) "peaking" up at ~10 degree in elevation for all azimuth angle with gain about −5 dB.

As the spacing among the elements increases (not shown), the donut pattern will become flatter with a higher "peak" gain at lower elevation angles. When the distance between two diagonal corners increases to half a wavelength, the peak gain at ~5° in elevation will be better (by at least 3 dB).

The upper right panel 631 of FIG. 6B illustrates another radiation patterns from the 4 element distributed array 610 controlled by a unique beam weighting vectors (BWV). The low right panel depicts two planar cuts of the shaped radiation pattern 631, one in elevation 632 and the other in azimuth 633. When the individual elements are weighted properly with a set of phase progressive weighting (0°, 90°, 180°, 270°), the corresponding beam features a RHCP receiving pattern with a peak of −3.5 dB at boresight (the direction along z-axis). The aperture efficiency for this antenna is less than 50%.

Figure 7:
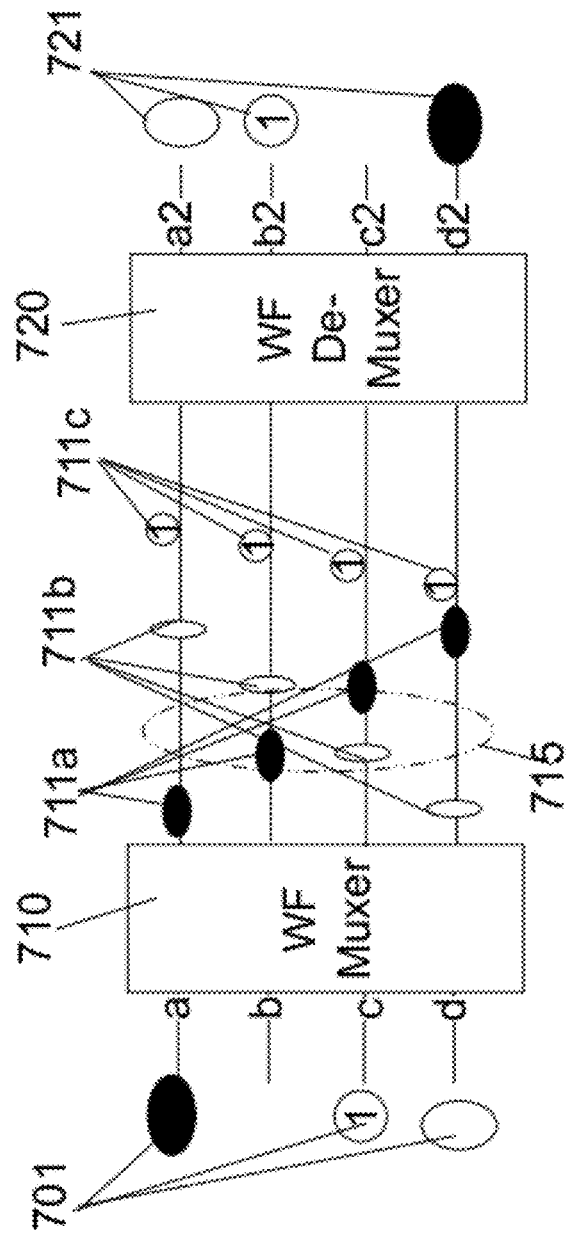
FIG. 7 illustrates an implementation concept of wavefront (WF) multiplexing (muxing) and demultiplexing (demuxing); a signal processing techniques utilizing multiple paths and orhtogonal wavefronts among multiplexed indipendent signals.

FIG. 7 700 illustrates an implementation concept of wavefront (WF) multiplexing (muxing) and demultiplexing (demuxing). There is a 4-to-4 WF muxing device 710, and a 4-to-4 WF de-muxing device 720, and 4 identical transmission lines 715 connecting the muxing and the demuxing devices. WF muxing/demuxing techniques are for signal processing utilizing multiple propagation paths. As indicated there are three independent signal streams 701, as indicated by a solid oval, a hollow oval and an oval with a number"1" in it, at the 3 or 4 inputs of the WF muxing device 710. As a result of the WF muxing, each of the input signal streams appears in all 4 transmission lines but with different spatial (amplitudes and phase) distributions as indicated by smaller ovals 711 accordingly. The three signals streams are "multiplexed" and propagated concurrently through the 4 parallel paths. Furthermore, each of the 4 paths features an aggregated signal channel resulting from a linear combination of the three independent signal streams. These spatial distributions among the 4 propagation paths for the three signal streams are characterized mathematically as 3 orthogonal wavefronts. The spatial distributions of the three input signals 701 are indicated by the various slopes among the small solid ovals 711a, among the small hollow ovals 711b, and among the small ovals with 711c. Reconstruction of the signal streams 721 via WF demuxing device 720 is possible because each wavefront is spatially orthogonal to each other.

Figure 7A:
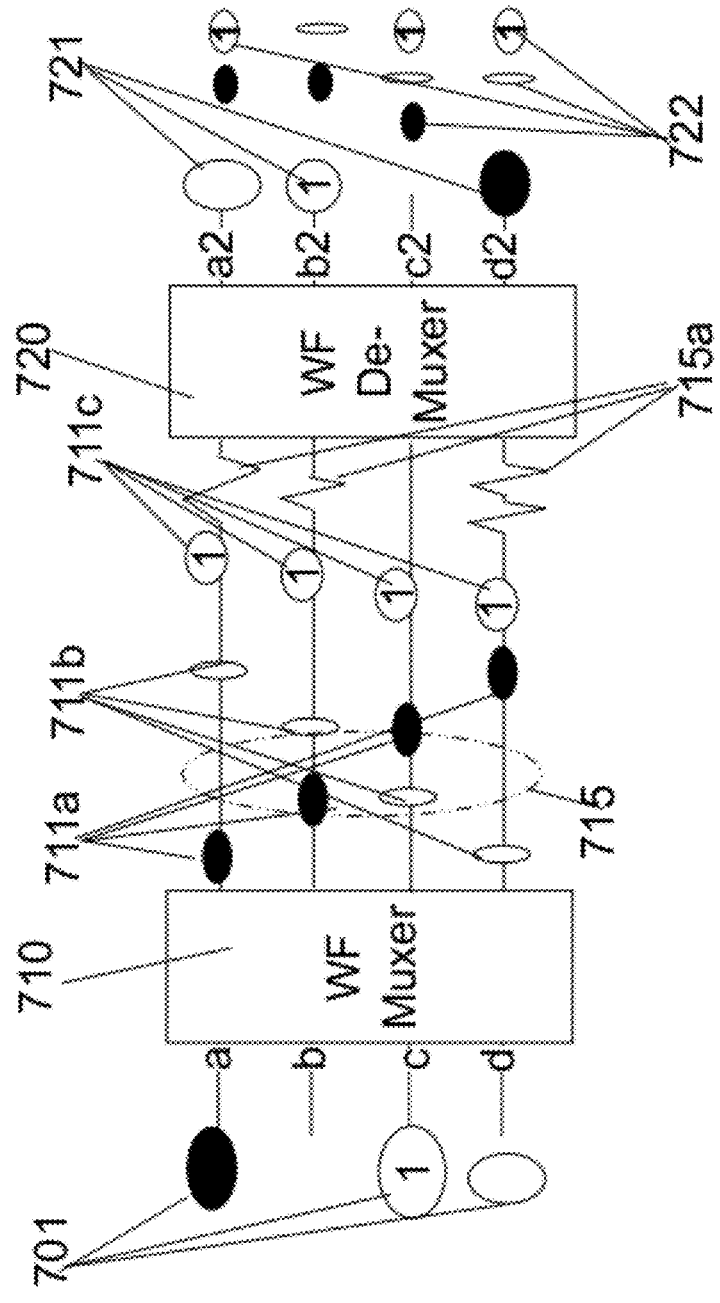
FIG. 7a illustrates leakages of de-multiplexed signals from a wavefront (WF) multiplexing (muxing) and demultiplexing (demuxing) implementation; WF muxing/demuxing are signal processing techniques utilizing multiple concurrent paths and orhtogonal wavefronts among multiplexed independent signals. When these multiple paths are not equalized, leakages among the multiplexed signals occurs as a result of non-orthogonal WFs.

FIG. 7A illustrates some effects of non-orthogonality among the three WFs due to unequal propagation delays among the 4 propagation paths in between a wavefront (WF) multiplexing (muxing) and demultiplexing (demuxing) processors. 4-to-4 WF muxing device 710 and 4-to-4 WF de-muxing device 720 and 4 identical transmission lines 715 connect the muxing and the demuxing devices. WF muxing/demuxing techniques are for signal processing utilizing multiple propagation paths. As indicated there are three independent signal streams 701, indicated by a solid oval, a hollow oval and an oval with a number "1" in it, at the 3 or the 4 inputs of the WF muxing device 710. As a result of the WF muxing, each of the input signal streams appears in all 4 transmission lines but with different spatial (amplitudes and phase) distributions as indicated by smaller ovals 711 accordingly. The three signals streams are "multiplexed" and propagating through the 4 parallel paths concurrently. Furthermore, each of the 4 paths features an aggregated signal channel resulting from a linear combinations of the three independent signal streams. These spatial distributions among the 4 propagation paths for the three signal streams indicated by the ovals (711a 711b and 711c) are characterized mathematically as 3 orthogonal wavefronts. There are additional setions of unequal paths 715a inserted between WF muxing and demuxing devices. As a result, the spatially wavefronts become un-orthogonal at the inputs of the WF demuxing device, the three associated 3 signals streams 721 signals cannot be "reconstructed" and "recovered" via a WF demuxing device 720 as depicted. There are leakage signals 722 among the 4 output channels.

Figure 7B:
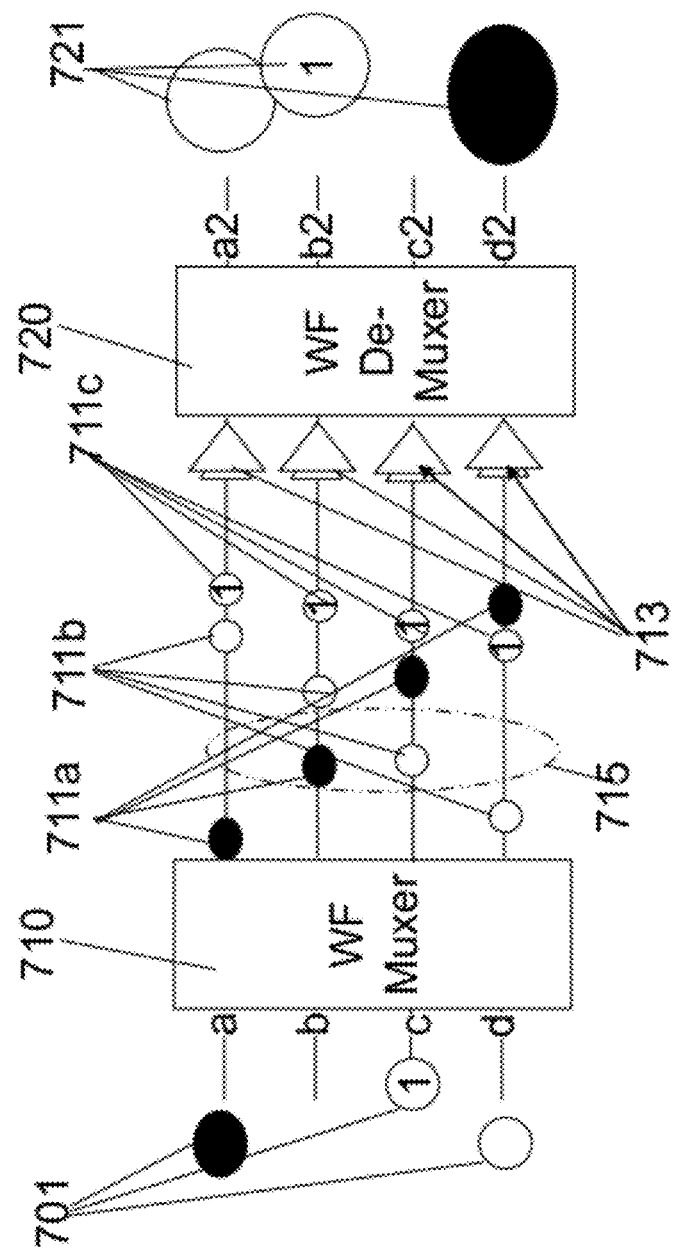
FIG. 7b illustrates an implementation concept of power amplifier modules utilizing wavefront (WF) multiplexing (muxing) and demultiplexing (demuxing); a signal processing techniques utilizing multiple paths and orhtogonal wavefronts among multiplexed independent signals.

FIG. 7B illustrates an implementation concept of a smart power amplifier module using wavefront (WF) multiplexing (muxing) and demultiplexing (demuxing). There are a 4-to-4 WF muxing device 710, and a 4-to-4 WF de-muxing device 720, a bank of 4 identical power amplifiers (PAs), and 4 identical transmission lines 715 connecting the muxing device and the PAs followed by the demuxing device 720. WF muxing/demuxing techniques for signal processing utilize multiple propagation paths. As indicated, there are three independent signal streams 701, indicated by a solid oval, a hollow oval and an oval with a number "1" in it, at the 3 or the 4 inputs of the WF muxing device 710. As a result of the WF muxing, each of the input signal streams appears in all 4 transmission lines but with different spatial (amplitudes and phase) distributions as indicated by smaller ovals accordingly. The three signals streams are "multiplexed" and propagating through the 4 parallel paths concurrently. Furthermore, each of the 4 paths features an aggregated signal channel resulting from a linear combinations of the three independent signal streams. These spatial distributions among the 4 propagation paths for the three signal streams indicated by the ovals (711a 711b and 711c) are characterized mathematically as 3 orthogonal wavefronts. The 4 power amplifiers (PAs) 713 provide amplifications for the 4 aggregated signal channels individually. The resulting three WFs for the amplified signals in the 4 propagation paths remain orthogonal. It is because the spatially orthogonal wavefronts, the three associated 3 amplified signals streams 721 can be "reconstructed" and "recovered" via a WF demuxing device 720 as depicted.

Furthermore, the WF muxing processor 701 can be digitally implemented at baseband (not shown). The associated outputs of the WF muxer 710 must be converted to analogue format at a RF frequency consistent with the operation frequency band of the PAs.

Figure 7C:
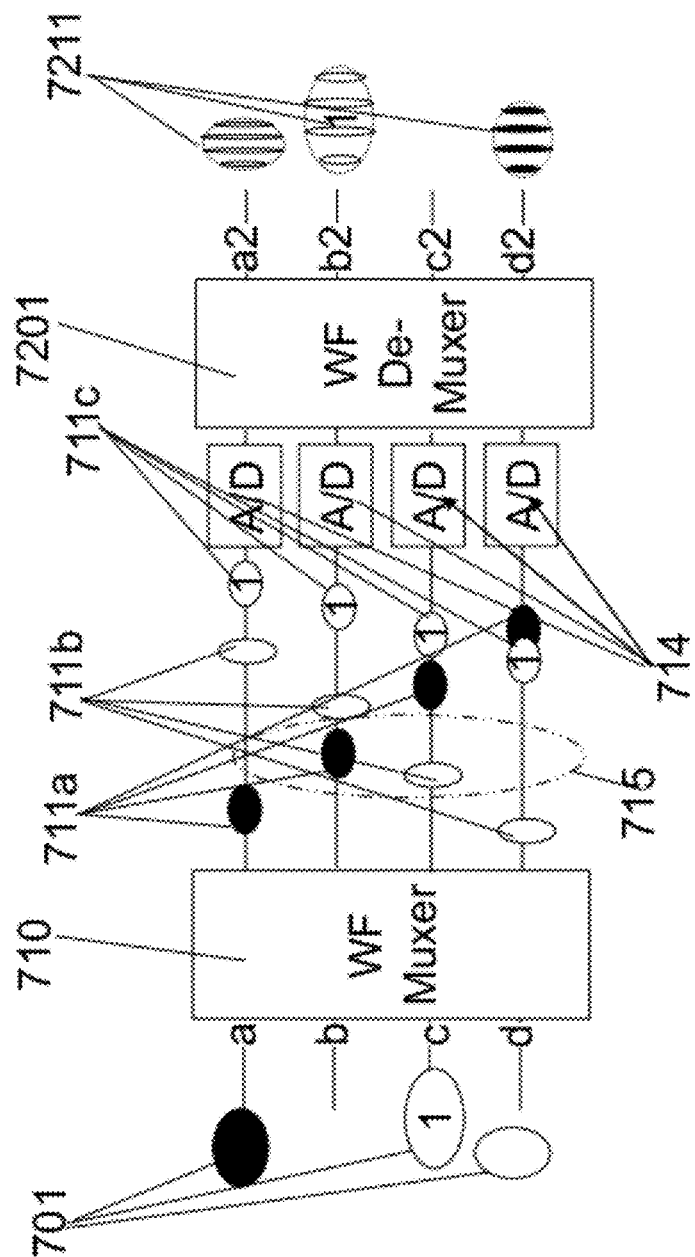
FIG. 7c illustrates an implementation concept of A/D modules utilizing wavefront (WF) multiplexing (muxing) and demultiplexing (demuxing); a signal processing techniques utilizing multiple paths and orhtogonal wavefronts among multiplexed independent signals.

FIG. 7C illustrates an implementation concept of A/D module using wavefront (WF) multiplexing (muxing) and demultiplexing (demuxing). There are a 4-to-4 WF muxing device 710, and a digital 4-to-4 WF de-muxing device 7201, a bank of 4 identical direct-conversion analogue to digital converters (A/Ds) 714, and 4 identical transmission lines 715 connecting the muxing device and the A/Ds 714 followed by the demuxing device. WF muxing/demuxing techniques are for signal processing utilizing multiple propagation paths. As indicated there are three independent signal streams 701, indicated by a solid oval, a hollow oval and an oval with a number "1" in it, at the 3 or the 4 inputs of the WF muxing device 710. As a result of the WF muxing 710, each of the input signal streams appears in all 4 transmission lines but with different spatial (amplitudes and phase) distributions, as indicated by smaller ovals accordingly. The three signals streams are "multiplexed" and propagated concurrently through the 4 parallel paths. Furthermore, each of the 4 paths features an aggregated signal channel resulting from a linear combinations of the three independent signal streams. These spatial distributions among the 4 propagation paths for the three signal streams indicated by the ovals (711a, 711b, and 711c) are characterized mathematically as 3 orthogonal wavefronts. The 4 direct-conversion A/Ds 714 provide direct sampling at RF and analogue to digital conversions for the 4 aggregated signal channels individually. The resulting three WFs for the digitized signals in the 4 propagation paths remain orthogonal. It is because the spatially orthogonal wavefronts, the three associated 3 digitized signals streams 7211 can be "reconstructed" and "recovered" via a digital WF demuxing device 7201 as depicted.

Furthermore, the WF muxing processor 701 can be implemented digitally at baseband 9 not shown). The associated outputs of the WF muxer must be converted to analogue format at a RF frequency consistent with the operation frequency band of the PAs.

Figure 8:
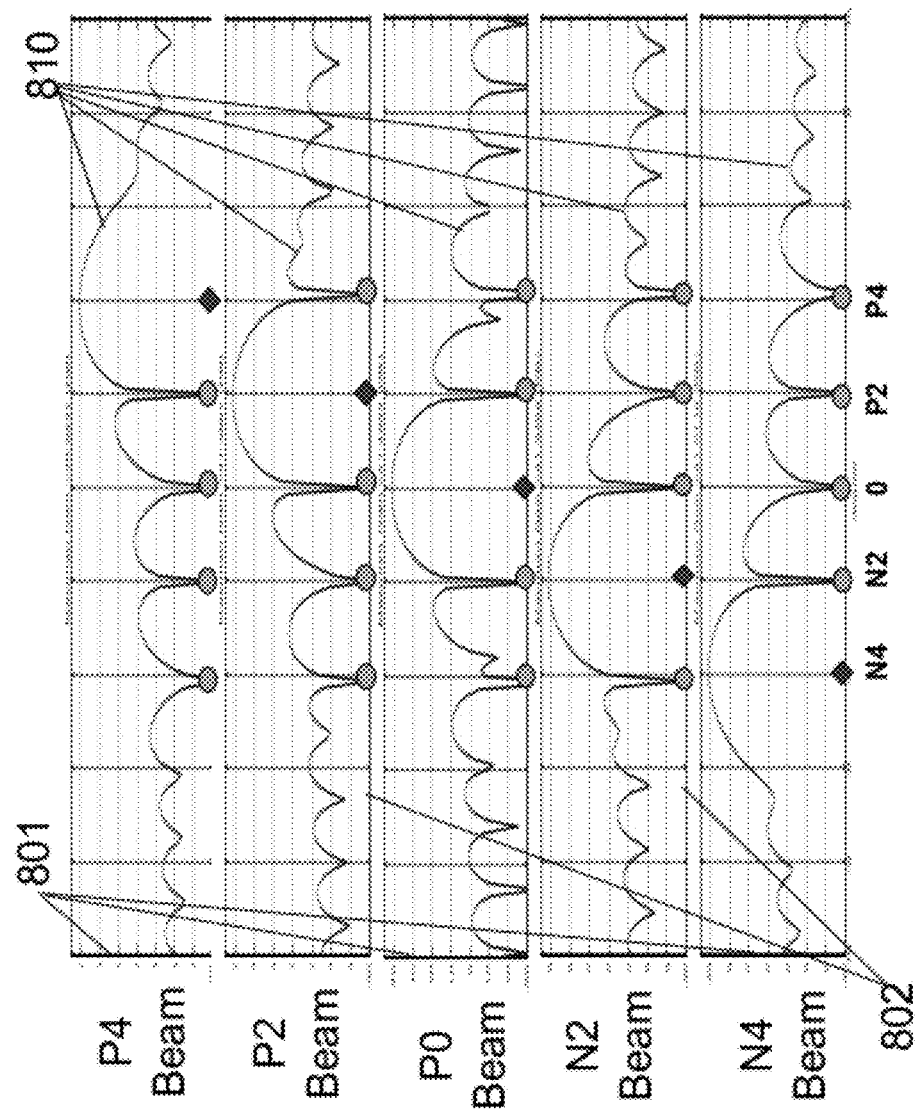
FIG. 8 illustrates features of orthogonal beams (OB). A set of 5 OBs generated by a portable device is invisioned.

FIG. 8 illustrates key features of Orthogonal Beams 810. There are 5 panels with vertical axes 801 indicating the antenna gains for various beams and the horizontal axes 802 the azimuth angles of a user antenna with various directions where five basestations (BS) are located. The directions for the five BSs are indicated by N4, N2, 0, P2, and P4. These multiple beams from the user device are not conventional beams with "high gain and low sidelobes." They are orthogonal beams (OBs), meaning that any of the five beams always peaks at nulls of all other beams. As the user, these five OB beams will move accordingly under the constraints that all five dynamic beams are always peaked at various desired directions while the beam-peak of a beam is always at nulls of all other 4 beams. As a result, the user device can concurrently communicate to the five BSs via the same spectrum.

What is claimed is:

1. A portable device comprising:
   multiple first radiating elements;
   a first receiving digital-beam-forming network arranged downstream of said first radiating elements;
   an inertial measurement unit; and
   a controller configured to calculate a beam weight vector of said first receiving digital-beam-forming network based on information from said inertial measurement unit.

2. The portable device of claim 1 further comprising a second receiving digital-beam-forming network arranged downstream of said first radiating elements and in parallel with said first receiving digital-beam-forming network, wherein said second receiving digital-beam-forming network has an input coupled to an input of said first receiving digital-beam-forming network.

3. The portable device of claim 1 having two first opposite parallel sides and two second opposite parallel sides each having two ends connecting with said two first opposite parallel sides respectively, wherein one of said first radiating elements comprises a first portion extending in a first longitudinal direction substantially parallel with said first opposite parallel sides.

4. The portable device of claim 3, wherein said one of said first radiating elements comprises a second portion extending in a second longitudinal direction substantially parallel with said second opposite parallel sides and connecting with said first portion of said one of said first radiating elements.

5. The portable device of claim 1 further comprising multiple amplifiers arranged in parallel with each other or one another, downstream of said first radiating elements and upstream of said first receiving digital-beam-forming network.

6. The portable device of claim 1 further comprising a selection unit arranged downstream of said first radiating elements and upstream of said first receiving digital-beam-forming network, wherein said selection unit is configured to select some from its inputs.

7. The portable device of claim 1 further comprising multiple frequency-down converters arranged in parallel with each other or one another, downstream of said first radiating elements and upstream of said first receiving digital-beam-forming network.

8. The portable device of claim 1 further comprising multiple analog-to-digital converters arranged in parallel with each other or one another, downstream of said first radiating elements and upstream of said first receiving digital-beam-forming network.

9. The portable device of claim 1 further comprising a first multiplexer arranged downstream of said first radiating elements and upstream of said first receiving digital-beam-forming network and a first demultiplexer arranged downstream of said first multiplexer and upstream of said first receiving digital-beam-forming network, wherein said first multiplexer is configured to generate a linear combination of multiple inputs of said first multiplexer, wherein said first demultiplexer is configured to recover one of said inputs of said first multiplexer.

10. The portable device of claim 9 further comprising multiple second radiating elements arranged in parallel with said first radiating elements, a second multiplexer arranged in parallel with said first multiplexer, downstream of said second radiating elements and upstream of said first receiving digital-beam-forming network and a second demultiplexer arranged in parallel with said first demultiplexer, downstream of said second multiplexer and upstream of said first receiving digital-beam-forming network, wherein said second multiplexer is configured to generate a linear combination of multiple inputs of said second multiplexer, wherein said second demultiplexer is configured to recover one of said inputs of said second multiplexer.

11. A portable device comprising:
    multiple radiating elements;
    a first receiving digital-beam-forming network arranged downstream of said radiating elements;
    a geo-location receiver;
    a controller configured to calculate a beam weight vector of said first receiving digital-beam-forming network based on information from said geo-location receiver; and
    a second receiving digital-beam-forming network arranged downstream of said radiating elements and in parallel with said first receiving digital-beam-forming network, wherein said second receiving digital-beam-forming network has an input coupled to an input of said first receiving digital-beam-forming network.

12. The portable device of claim 11 further comprising a multiplexer arranged downstream of said radiating elements and upstream of said first and second receiving digital-beam-forming networks and a demultiplexer arranged downstream of said multiplexer and upstream of said first and second receiving digital-beam-forming networks, wherein said multiplexer is configured to generate a linear combination of multiple inputs of said multiplexer, wherein said demultiplexer is configured to recover one of said inputs of said multiplexer.

13. The portable device of claim 11 further comprising multiple amplifiers arranged in parallel with each other or one another, downstream of said radiating elements and upstream of said first and second receiving digital-beam-forming networks.

14. The portable device of claim 11 further comprising a selection unit arranged downstream of said radiating elements and upstream of said first and second receiving digital-beam-forming networks, wherein said selection unit is configured to select some from its inputs.

15. The portable device of claim 11 further comprising multiple frequency-down converters arranged in parallel with each other or one another, downstream of said radiating elements and upstream of said first and second receiving digital-beam-forming networks.

16. The portable device of claim 11 further comprising multiple analog-to-digital converters arranged in parallel with each other or one another, downstream of said radiating elements and upstream of said first and second receiving digital-beam-forming networks.

17. The portable device of claim 11 having two first opposite parallel sides and two second opposite parallel sides each having two ends connecting with said two first opposite parallel sides respectively, wherein one of said radiating elements comprises a first portion extending in a first longitudinal direction substantially parallel with said first opposite parallel sides and a second portion extending in a second longitudinal direction substantially parallel with said second opposite parallel sides.

18. The portable device of claim 11 further comprising an inertial measurement unit, wherein said controller is configured to calculate said beam weight vector of said first receiving digital-beam-forming network further based on information from said inertial measurement unit.

19. A portable device comprising:
multiple radiating elements;
a first transmitting digital-beam-forming network arranged upstream of said radiating elements;
an inertial measurement unit; and
a controller configured to calculate a beam weight vector of said first transmitting digital-beam-forming network based on information from said inertial measurement unit.

20. The portable device of claim 19 further comprising a second transmitting digital-beam-forming network arranged upstream of said radiating elements and in parallel with said first transmitting digital-beam-forming network, wherein said second transmitting digital-beam-forming network has an output coupled to an output of said first transmitting digital-beam-forming network.

21. The portable device of claim 19 having two first opposite parallel sides and two second opposite parallel sides each having two ends connecting with said two first opposite parallel sides respectively, wherein one of said radiating elements comprises a first portion extending in a first longitudinal direction substantially parallel with said first opposite parallel sides.

22. The portable device of claim 21, wherein said one of said radiating elements comprises a second portion extending in a second longitudinal direction substantially parallel with said second opposite parallel sides and connecting with said first portion of said one of said radiating elements.

23. The portable device of claim 19 further comprising multiple amplifiers arranged in parallel with each other or one another, upstream of said radiating elements and downstream of said first transmitting digital-beam-forming network.

24. The portable device of claim 19 further comprising a selection unit arranged upstream of said radiating elements and downstream of said first transmitting digital-beam-forming network, wherein said selection unit is configured to select some from said radiating elements and configured to have its inputs to be sent to said some of said radiating elements.

25. The portable device of claim 19 further comprising multiple frequency-up converters arranged in parallel with each other or one another, upstream of said radiating elements and downstream of said first transmitting digital-beam-forming network.

26. A portable device comprising:
multiple radiating elements;
a first transmitting digital-beam-forming network arranged upstream of said radiating elements;
a geo-location receiver;
a controller configured to calculate a beam weight vector of said first transmitting digital-beam-forming network based on information from said geo-location receiver; and
a second transmitting digital-beam-forming network arranged upstream of said radiating elements and in parallel with said first transmitting digital-beam-forming network, wherein said second transmitting digital-beam-forming network has an output coupled to an output of said first transmitting digital-beam-forming network.

27. The portable device of claim 26 further comprising an inertial measurement unit, wherein said controller is configured to calculate said beam weight vector of said first transmitting digital-beam-forming network further based on information from said inertial measurement unit.

28. The portable device of claim 26 further comprising a selection unit arranged upstream of said radiating elements and downstream of said first transmitting digital-beam-forming network, wherein said selection unit is configured to select some from said radiating elements and configured to have its inputs to be sent to said some of said radiating elements.

* * * * *